United States Patent
Jung et al.

(10) Patent No.: US 11,330,585 B2
(45) Date of Patent: May 10, 2022

(54) APPARATUS AND METHOD FOR USING MULTIPLE CARRIERS IN WIRELESS COMMUNICATION SYSTEM

(71) Applicants: Samsung Electronics Co., Ltd., Suwon-si (KR); SEOUL NATIONAL UNIVERSITY R&DB FOUNDATION, Seoul (KR)

(72) Inventors: Byounghoon Jung, Suwon-si (KR); Jihoon Kim, Seongnam-si (KR); Sunghyun Choi, Seoul (KR); Seung-Hoon Park, Suwon-si (KR); Jungsoo Jung, Suwon-si (KR); Taejun Park, Seongnam-si (KR); Kangjin Yoon, Seoul (KR); Jaehong Yi, Seoul (KR); Sunwook Hwang, Seoul (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 122 days.

(21) Appl. No.: 16/636,819

(22) PCT Filed: Aug. 29, 2018

(86) PCT No.: PCT/KR2018/009972
§ 371 (c)(1),
(2) Date: Feb. 5, 2020

(87) PCT Pub. No.: WO2019/045442
PCT Pub. Date: Mar. 7, 2019

(65) Prior Publication Data
US 2020/0374880 A1    Nov. 26, 2020

(30) Foreign Application Priority Data
Aug. 31, 2017   (KR) .......................... 10-2017-0111389

(51) Int. Cl.
*H04W 72/04* (2009.01)
*H04W 24/10* (2009.01)

(52) U.S. Cl.
CPC ....... *H04W 72/0453* (2013.01); *H04W 24/10* (2013.01)

(58) Field of Classification Search
CPC . H04W 72/0453; H04W 24/10; H04W 16/14; H04W 24/08; H04W 48/12; H04W 72/085; H04W 72/042; H04L 5/001
See application file for complete search history.

(56) References Cited

U.S. PATENT DOCUMENTS 9,918,232 B2 *   3/2018   Khawer ................ H04W 16/14
10,085,289 B2 *  9/2018   Aguirre ............... H04W 74/002
(Continued)

FOREIGN PATENT DOCUMENTS

EP    2958376 A1    12/2015

OTHER PUBLICATIONS

Huawei, HiSilicon; 3GPP TSG RAN WG1 Meeting #87; Coexistence between NR and LTE; R1-1611681; Nov. 14, 2016.
(Continued)

*Primary Examiner* — Brian T O Connor
(74) *Attorney, Agent, or Firm* — Jefferson IP Law, LLP

(57) ABSTRACT

Disclosed is a 5th generation (5G) or pre-5G communication system for supporting a data transmission rate higher than that of a 4th generation (4G) communication system such as long-term evolution (LTE). According to various embodiments of the present disclosure, a terminal operation method in a wireless communication system comprises the steps of: identifying a primary anchor carrier among a plurality of anchor carriers used by a base station; and receiving an information signal (IS) from the base station through the identified primary anchor carrier, wherein the primary
(Continued)

anchor carrier can be continuously maintained in order to receive the IS from the base station.

20 Claims, 26 Drawing Sheets

(56) References Cited

U.S. PATENT DOCUMENTS

| | | | | |
|---|---|---|---|---|
| 10,172,014 | B2* | 1/2019 | Egner | H04W 72/082 |
| 10,582,409 | B2* | 3/2020 | Vajapeyam | H04W 24/10 |
| 10,681,684 | B2* | 6/2020 | Rico Alvarino | H04W 72/048 |
| 10,764,892 | B2* | 9/2020 | Liao | H04W 48/16 |
| 10,772,089 | B2* | 9/2020 | Xiao | H04W 72/042 |
| 10,892,868 | B2* | 1/2021 | Yan | H04W 76/27 |
| 11,095,409 | B2* | 8/2021 | Ye | H04L 5/0053 |
| 2010/0034163 | A1 | 2/2010 | Damnjanovic et al. | |
| 2011/0142009 | A1 | 6/2011 | Lindoff et al. | |
| 2011/0305290 | A1 | 12/2011 | Kim et al. | |
| 2016/0345323 | A1 | 11/2016 | Krishnamoorthy et al. | |
| 2018/0167972 | A1* | 6/2018 | Egner | H04W 72/0453 |
| 2018/0176792 | A1* | 6/2018 | Egner | H04W 16/16 |
| 2020/0374880 | A1* | 11/2020 | Jung | H04W 48/12 |

OTHER PUBLICATIONS

ZTE, Key Issues to be Considered for HSPA+LTE Aggregation, 3GPP TSG-RAN WG2 meeting #75, R2-113904, Athens, Greece, Aug. 22-26, 2011.

LTE; Evolved Universal Terrestrial Radio Access (E-UTRA); Radio Resource Control (RRC); Protocol specification, (3GPP TS 36.331 version 14.3.0 Release 14); Oct. 2017.

Intel Corporation, Secondary primary cell in SeNB, 3GPP TSG RAN WG2 Meeting #84 R2-134279, San Francisco, USA, Nov. 11-15, 2013.

Korean Office Action dated Feb. 11, 2022, issued in Korean Application No. 10-2017-0111389.

* cited by examiner

APPARATUS AND METHOD FOR USING MULTIPLE CARRIERS IN WIRELESS COMMUNICATION SYSTEM

TECHNICAL FIELD

The disclosure generally relates to a wireless communication system and, more particularly, to an apparatus and a method for operating a plurality of anchor carriers in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to overcome the limit of a licensed band, communication technology {e.g., licensed assisted access (LAA)} that uses both a licensed band and an unlicensed band is under development. This communication technology performs an LBT (Listen-Before-Talk) procedure for coexistence with communication technology operated in the unlicensed band. However, system information, such as control information, is also transmitted through the LBT procedure, which may degrade communication quality due to a delay.

DISCLOSURE OF INVENTION

Technical Problem

Based on the above discussion, this disclosure provides a device and a method for operating a plurality of anchor carriers for an information signal (IS) in a wireless communication system.

This disclosure can provide a device and a method for transmitting an information signal by operating a primary anchor carrier in a wireless communication system.

This disclosure can provide a device and method for providing notification of a plurality of anchor carriers in a wireless communication system.

In addition, this disclosure can provide a device and a method for performing measurement in a cell in which a plurality of anchor carriers are operated in a wireless communication system.

Solution to Problem

According to various embodiments, a method of operating a terminal in a wireless communication system may include: identifying a primary anchor carrier, among a plurality of anchor carriers used by a base station; and receiving an information signal (IS) from the base station through the identified primary anchor carrier, wherein the primary anchor carrier may be continuously maintained to receive the information signal from the base station.

According to various embodiments, a method of operating a base station in a wireless communication system may include: determining a plurality of anchor carriers including a primary anchor carrier; and transmitting an information signal to a terminal through the primary anchor carrier, wherein the primary anchor carrier is continuously maintained in order to transmit the information signal to the terminal.

According to various embodiments, a device of a terminal in a wireless communication system may include: at least one transceiver; and at least one processor configured to be operatively connected to the at least one transceiver; wherein the at least one processor is configured to: identify a primary anchor carrier, among a plurality of anchor carriers used by a base station; and receive an information signal from the base station through the identified primary anchor carrier, and wherein the primary anchor carrier is continuously maintained to receive the information signal from the base station.

According to various embodiments, a device of a network node in a wireless communication system may include: at least one transceiver; and at least one processor configured to be operatively connected to the at least one transceiver, wherein the at least one processor is further configured to: determine a plurality of anchor carriers including a primary anchor carrier; and transmit an information signal to a terminal through the primary anchor carrier, and wherein the primary anchor carrier is continuously maintained to transmit the information signal to the terminal.

Advantageous Effects of Invention

A device and a method according to various embodiments can increase reliability of transmission of an information signal (IS) and can reduce an unnecessary delay time for IS transmission by operating a plurality of anchor carriers.

Effects which can be acquired by the present disclosure are not limited to the above described effects, and other effects that have not been mentioned may be clearly understood by those skilled in the art from the following description.

BEST MODE FOR CARRYING OUT THE INVENTION

Figure 1:
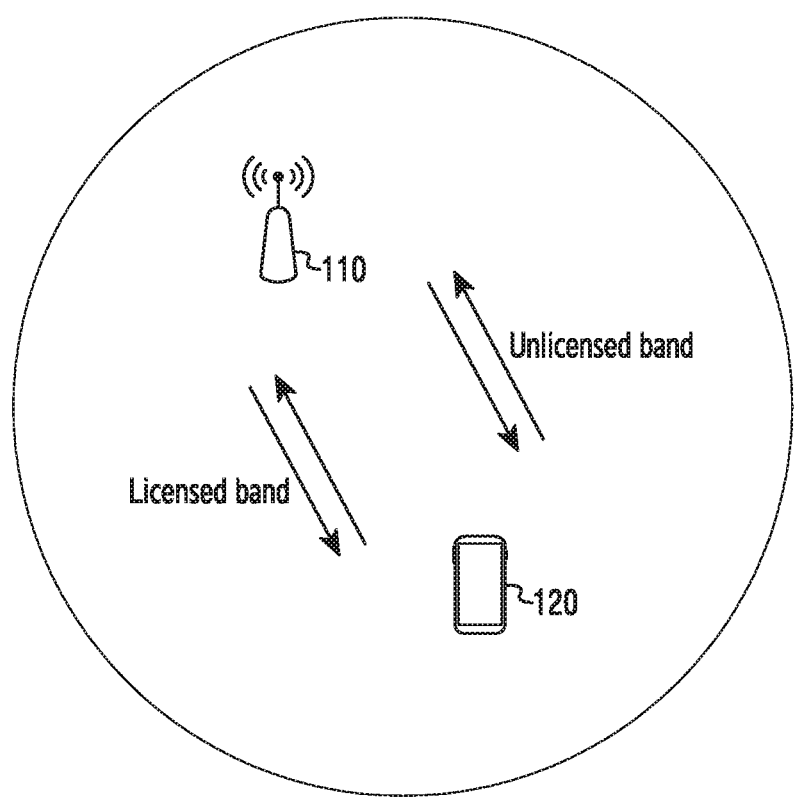
FIG. 1 illustrates a wireless communication system according to various embodiments.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other device or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

Various embodiments relate to a device and a method for transmitting and receiving an information signal (IS) in a wireless communication system. More specifically, various embodiments will describe a technique for operating a plurality of carriers in order to transmit and receive an information signal {e.g., discovery reference signal (DRS)} for control in an unlicensed band of a wireless communication system.

Terms referring to information (e.g., resource measurement values, setting values, or the like), terms referring to network entities (e.g., a terminal, nodes, a device, or the like), terms referring to messages (e.g., signals, data, reports, or the like), terms referring to components of a device (e.g., a controller, a wireless communication unit, a communication unit, a backhaul communication unit, a storage unit, or the like), and the like, which are used hereinafter, are illustrative words used for the convenience of explanation. Accordingly, the present disclosure is not limited to the terms described later, and other terms having equivalent technical meanings can be used.

In addition, although various embodiments are described using terms used in some communication standards {e.g., 3rd Generation Partnership Project (3GPP)}, these are merely illustrative examples. Various embodiments of the present disclosure may be easily modified and applied to other communication systems as well.

FIG. 1 illustrates a wireless communication system according to various embodiments.

FIG. 1 illustrates a base station 110 and a terminal 120 as parts of nodes that use a wireless channel in a wireless communication system. Although FIG. 1 illustrates only one base station and one terminal, other base stations (e.g., another base station 1800 in FIG. 18, another base station 1900 in FIG. 19, or the like), which are the same as or similar to the base station 110, and/or other terminals the same as or similar to the terminal 120 may be further included.

The base station 110 is a piece of network infrastructure providing wireless access to the terminal 120. The base station 110 has coverage defined as a specific geographic area based on the distance over which the signal can be transmitted. The base station 110 may be referred to as an "access point (AP)", an "eNodeB (eNB)", a "5th generation (5G) node", a "wireless point", a "transmission/reception point (TRP)", or other terms having an equivalent technical meaning, in addition to a "base station".

The terminal 120 is a device used by a user and communicates with the base station 110 via a wireless channel. In some cases, the terminal 120 may be operated without user involvement. That is, the terminal 120 is a device for performing machine-type communication (MTC), and may not be carried by a user. The terminal 120 may be referred to as "user equipment (UE)", a "mobile station", a "subscriber station", "customer premises equipment (CPE)", a "remote terminal", a "wireless terminal", an "electronic device", a "user device", or other terms having an equivalent technical meaning, in addition to a terminal.

Referring to FIG. 1, the base station 110 and the terminal 120 may transmit and/or receive wireless signals in licensed bands. Here, the licensed bands may mean frequency bands occupied by an authorized operator. For example, the licensed bands may include a frequency band for LTE (Long-Term Evolution). In addition, the base station 110 and the terminal 120 may transmit and/or receive wireless signals in unlicensed bands. Here, the unlicensed bands may be remaining bands, except for the licensed bands, among the all frequency bands, and may include frequency bands, which can be occupied by individuals or any operator. For example, the unlicensed bands may include a frequency band for Wi-Fi (wireless fidelity).

In the licensed bands, bands of channels {e.g., a physical broadcast channel (PBCH), a physical downlink control channel (PDCCH), or the like} for transmitting control information, such as synchronization signals {e.g., a primary synchronization signal (PSS), a secondary synchronization signal (SSS), or the like} or system information {e.g., a master information block (MIB), a system information block (SIB), or the like}, may be predefined by the operator. However, in the bands, which are not occupied by a specific operator, such as unlicensed bands, a band for transmitting the above-described control information (that is, an anchor carrier) is required to be set. Hereinafter, operations of a base station and a terminal for operating a plurality of anchor carriers through which control information is transmitted in the unlicensed band will be described with reference to FIGS. 2 to 19. In the following description, control information for controlling communication in the unlicensed band, which performs the same or a similar function as the synchronization signal or the system information in the licensed band, will be referred to as a "control signal (or information signal)" for the convenience of explanation.

Figure 2:
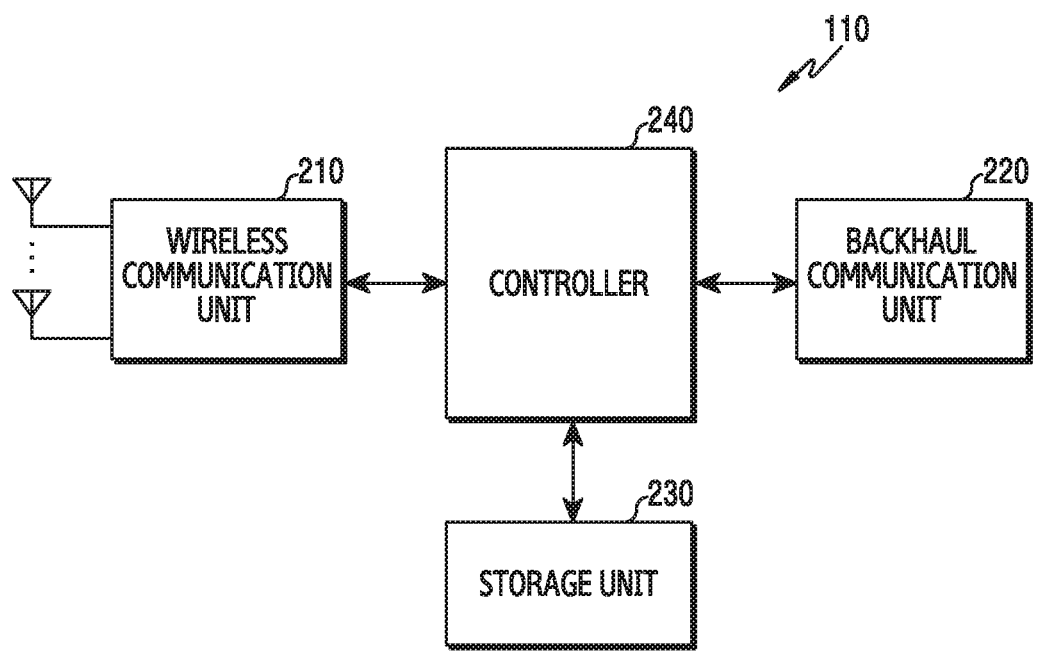
FIG. 2 illustrates an example of configuration of a base station in a wireless communication system according to various embodiments.

FIG. 2 illustrates an example of configuration of a base station in a wireless communication system according to various embodiments. The configuration illustrated in FIG. 2 may be understood as a configuration of the base station 110. Hereinafter, the term "-unit", "-er (or)", or the like denotes a unit for processing at least one function or operation, and may be implemented by hardware, software, or a combination thereof.

Referring to FIG. 2, the base station 110 may include a wireless communication unit 210, a backhaul communication unit 220, a storage unit 230, and a controller 240.

The wireless communication unit 210 performs functions for transmitting and receiving signals through a wireless channel. For example, the wireless communication unit 210 performs a function of transformation between a baseband signal and a bit string according to the physical layer specification of a system. For example, in the case of data transmission, the wireless communication unit 210 generates complex symbols by encoding and modulating a transmission bit string. In the case of data reception, the wireless communication unit 210 restores a reception bit string by demodulating and decoding a baseband signal. In addition, the wireless communication unit 210 may up-convert a baseband signal to a radio frequency (RF) band signal to then transmit the same through an antenna, and may down-convert an RF band signal received through an antenna to a baseband signal.

To this end, the wireless communication unit 210 may include a transmitting filter, a receiving filter, an amplifier, a mixer, an oscillator, a digital-to-analog convertor (DAC), an analog-to-digital convertor (ADC), and the like. In addition, the wireless communication unit 210 may include a plurality of transmission/reception paths. Further, the wireless communication unit 210 may include at least one antenna array including a plurality of antenna elements. In terms of hardware, the wireless communication unit 210 may include a digital unit and an analog unit, and the analog unit may include a plurality of sub-units depending on operation power, operation frequency, and the like.

The wireless communication unit 210 transmits and receives signals as described above. Accordingly, all or some of the wireless communication unit 210 may be referred to as a "transmitter", a "receiver", or a "transceiver". In the following description, the transmission and reception performed through a wireless channel will be used to encompass execution of the process by the wireless communication unit 210 as described above.

The backhaul communication unit 220 provides an interface for communication with other nodes in the network. That is, the backhaul communication unit 220 converts bit strings transmitted from the base station 110 to other nodes (e.g., another access node, another base station, an upper node, a core network, or the like) into physical signals, and converts physical signals received from other nodes into bit strings.

The storage unit 230 stores data such as fundamental programs for the operation of the base station 110, application programs, and configuration information. The storage unit 230 may be configured as a volatile memory, a non-volatile memory, or a combination thereof. In addition, the storage unit 230 may provide the stored data upon request by the controller 240.

The controller 240 controls the overall operation of the base station 110. For example, the controller 240 transmits and receives signals via the wireless communication unit 210 or the backhaul communication unit 220. The controller 240 also writes and reads data to and from the storage unit 230. The controller 240 may perform the functions of a protocol stack required by the communication standard. To this end, the controller 240 may include at least one processor.

According to various embodiments, the controller 240 may include a transmission carrier determiner for determining a carrier for continuously transmitting information signals. The transmission carrier determiner, which is a set of instructions or codes stored in the storage unit 230, may be a storage space storing instructions/codes, at least temporarily, residing in the controller 240 or instructions/codes, or may be a part of a circuitry constituting the controller 240. According to various embodiments, the controller 240 may determine a plurality of carriers for transmitting control signals, and, based on the plurality of determined carriers, may transmit control signals to the terminal 120. For example, the controller 240 may perform control such that the base station 110 performs operations according to various embodiments described below.

Figure 3:
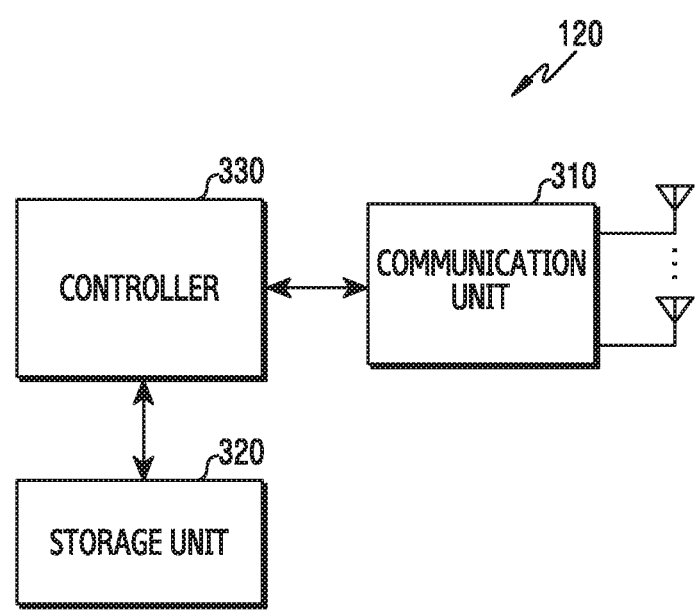
FIG. 3 illustrates an example of configuration of a terminal in a wireless communication system according to various embodiments.

FIG. 3 illustrates an example of configuration of a terminal in a wireless communication system according to various embodiments. The configuration illustrated in FIG. 3 may be understood as the configuration of the terminal 120. Hereinafter, the term "-unit", "-er (or)", or the like denotes a unit for processing at least one function or operation, and may be implemented by hardware, software, or a combination thereof.

Referring to FIG. 3, the terminal 120 includes a communication unit 310, a storage unit 320, and a controller 330.

The communication unit 310 performs functions for transmitting and receiving signals through a wireless channel. For example, the communication unit 310 performs a function of transformation between a baseband signal and a bit string according to the physical layer specification of a system. For example, in the case of data transmission, the communication unit 310 generates complex symbols by encoding and modulating a transmission bit string. In the case of data reception, the communication unit 310 restores a reception bit string by demodulating and decoding a baseband signal. In addition, the communication unit 310 may up-convert a baseband signal to an RF band signal to then transmit the same through an antenna, and may down-convert an RF band signal received through an antenna to a baseband signal. To this end, the communication unit 310 may include a transmitting filter, a receiving filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit {e.g., radio frequency integrated circuit (RFIC)}. The digital circuit and the analog circuit may be implemented as a single package. The communication unit 310 may include a plurality of RF chains. The communication unit 310 may further perform beamforming.

The communication unit 310 may include different communication modules for processing signals in different frequency bands. Further, the communication unit 310 may include a plurality of communication modules for supporting a plurality of different wireless access technologies. For example, different wireless access technologies may include Bluetooth Low Energy (BLE), Wireless Fidelity (Wi-Fi), Wi-Fi Gigabyte (WiGig), cellular networks {e.g., Long Term Evolution (LTE)}, and the like. Different frequency bands may include a super-high frequency (SHF) band (e.g., 2.5 GHz or 5 GHz) and a millimeter wave band (e.g., 60 GHz).

The communication unit 310 transmits and receives signals as described above. Accordingly, all or some of the communication unit 310 may be referred to as a "transmitter", a "receiver", or a "transceiver". In the following description, the transmission and reception performed through a wireless channel will be used to encompass the execution of the process by the communication unit 310 as described above.

The storage unit 320 stores data such as fundamental programs for the operation of the terminal 120, application programs, and configuration information. The storage unit 320 may be configured as a volatile memory, a non-volatile memory, or a combination thereof. In addition, the storage unit 320 may provide the stored data upon request by the controller 330.

The controller 330 controls the overall operation of the terminal 120. For example, the controller 330 may transmit and receive signals through the communication unit 310. The controller 330 writes or reads data to or from the storage unit 320. The controller 330 may perform the functions of the protocol stack required for the communication standard. To this end, the controller 330 may include at least one processor or microprocessor, or may be a part of a processor. A part of the communication unit 310 and the controller 330 may be referred to as a "communication processor (CP)". According to various embodiments, the controller 330 may include a reception carrier determiner for determining a carrier for receiving an information signal. The reception carrier determiner, which is a set of instructions or codes stored in the storage unit 330, may be a storage space storing instructions/codes, at least temporarily, residing in the controller 330 or instructions/codes, or may be a part of a circuitry constituting the controller 330. According to various embodiments, the controller 330 may receive information on a plurality of carriers, and, based on the received information, may determine at least one carrier for receiving a control signal. For example, the controller 330 may perform control such that the terminal performs operations according to various embodiments described below.

Determination of Primary Anchor Carrier

Figure 4:
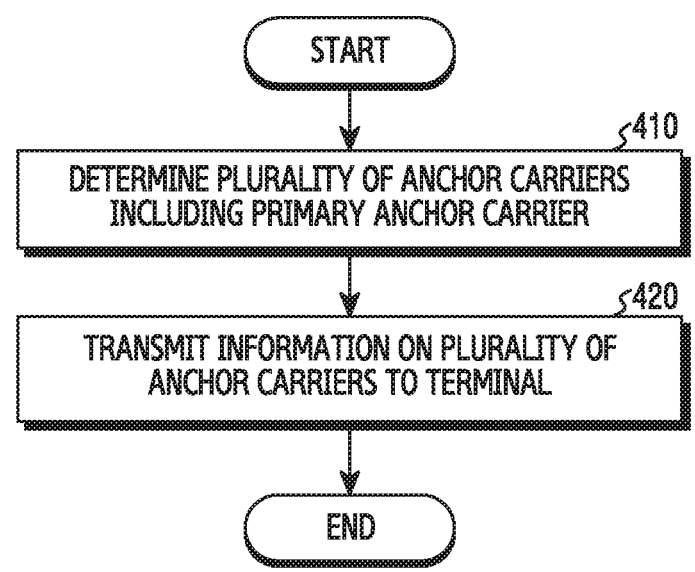
FIG. 4 is a flowchart illustrating the operation of a base station operating a plurality of anchor carriers in a wireless communication system according to various embodiments.

FIG. 4 is a flowchart illustrating the operation of a base station operating a plurality of anchor carriers in a wireless communication system according to various embodiments. The base station 110 in FIG. 1 will be illustrated as an example of a base station. In various embodiments, the operations described below may be performed in an unlicensed band.

In operation 410, the base station 110 may determine a plurality of anchor carriers including a primary anchor carrier.

In various embodiments, the anchor carrier may be a carrier for communication of a control signal, among the carriers used for communication between the base station 110 and the terminal 120. Here, the anchor carrier means a carrier for transmission of a control signal. In order to reduce the delay time due to channel occupation of other nodes, a plurality of carriers may be operated. The base station 110 may determine a plurality of carriers in a frequency band for transmitting control signals to the terminal 120.

In various embodiments, the control signal may include at least one information signal (IS), security input, non-access stratum (NAS), mobility information, and a paging message.

The information signal may include at least one of a primary synchronization signal (PSS), a secondary synchronization signal (SSS), a master information block (MIB), a system information block (SIB), a radio resource management (RRM), a measurement reference signal, a cell-specific reference signal (CRS), a channel state information-reference signal (CSI-RS), a demodulation-RS (DM-RS), and a discovery reference signal (DRS).

In various embodiments, the anchor carrier may include channels for transmitting and receiving control signals. For example, an anchor carrier may include a physical uplink control channel (PUCCH) or a physical random access channel (PRACH). The PUCCH may be a channel for transmitting and receiving at least one of a scheduling request (SR), a hybrid automatic repeat request (HARQ), acknowledge (ACK)/negative-acknowledge (NACK) feedback, and/or channel quality feedback. The PRACH may be a channel capable of performing random access (RA).

According to various embodiments, the base station 110 may determine a primary anchor carrier, among a plurality of anchor carriers. The base station 110 may operate a primary anchor carrier in order to increase the reliability of control signal transmission. The primary anchor carrier may be a frequency band for continuously maintaining transmission of the control signal. The base station 110 may determine the frequency band corresponding to the primary anchor carrier. In some embodiments, the primary anchor carrier may be changed to another one of the plurality of anchor carriers by the setting of the base station 110 or the terminal 120.

In operation 420, the base station 110 may transmit information on a plurality of anchor carriers to the terminal 120. Information on a plurality of anchor carriers may include information on a primary anchor carrier. The base station 110 may transmit information on frequency bands of a plurality of anchor carriers to the terminal 120. In some embodiments, the base station 110 may transmit information on a plurality of anchor carriers to the terminal 120 by means of explicit signaling. For example, information on a plurality of anchor carriers may include information indicating a frequency band. In some other embodiments, the base station 110 may transmit information on a plurality of anchor carriers to the terminal 120 in an implicit manner. For example, the base station 110 may inform the terminal 120 of information on a specific anchor carrier by transmitting a control signal through a specific anchor carrier.

Figure 5:
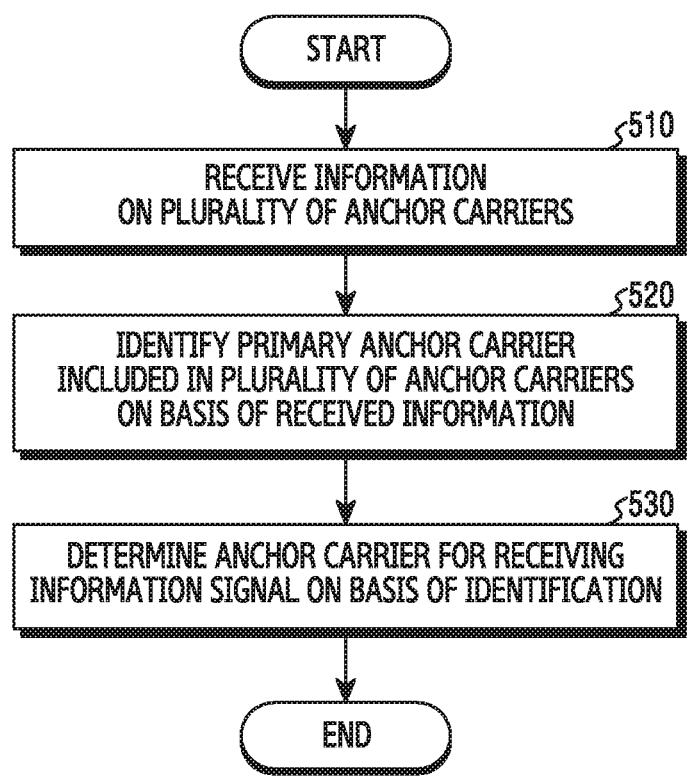
FIG. 5 is a flowchart illustrating the operation of a terminal operating a plurality of anchor carriers in a wireless communication system according to various embodiments.

FIG. 5 is a flowchart illustrating the operation of a terminal operating a plurality of anchor carriers in a wireless communication system according to various embodiments. The terminal 120 in FIG. 1 will be illustrated as an example of a terminal. In various embodiments, the operations described below may be performed in the unlicensed band.

In operation 510, the terminal 120 may receive information on a plurality of anchor carriers. The received information may indicate frequency bands for the respective anchor carriers. For example, when a plurality of anchor carriers includes a primary anchor carrier and a first anchor carrier, the received information may include information indicating a frequency band for the primary anchor and information indicating a frequency band for the first anchor carrier.

In operation 520, based on the received information, the terminal 120 may identify a primary anchor carrier, among a plurality of anchor carriers. The received information may include information on a frequency band that is continuously maintained. The terminal 120 may determine, as a primary anchor carrier, a carrier corresponding to the continuously maintained frequency band.

In various embodiments, the primary anchor carrier may be a band in which dynamic frequency selection (DFS) is not performed. According to an embodiment, based on the primary anchor carrier that does not perform dynamic frequency selection (DFS), the terminal 120 may maintain a connection with the base station 110. According to an embodiment, all of the anchor carriers may be bands in which the DFS is not performed. For example, the frequency bands of a plurality of anchor carriers may be determined based on frequency bands of 5170 MHz to 5250 MHz and/or 5735 MHz to 5835 MHz. The range of the frequency band is not limited to the above-mentioned example, and may correspond to a band in which the DFS is not performed.

In various embodiments, the received information may include information indicating at least one anchor carrier. Based on the information indicating at least one anchor carrier, the terminal 120 may identify at least one anchor carrier. In some embodiments, the received information may include information on a frequency band for a predetermined time interval (or a predetermined duration or a predetermined interval). The terminal 120 may determine that the carrier corresponding to the frequency band for the predetermined time interval is at least one anchor carrier.

In operation 530, the terminal 120 may determine an anchor carrier for receiving an information signal (hereinafter, referred to as "IS"). In various embodiments, the terminal 120, based on the received information, may determine at least one anchor carrier, among the plurality of anchor carriers. The terminal 120 may receive the ISs through the anchor carriers. In some embodiments, the anchor carriers may include a primary anchor carrier, and may receive the ISs continuously through the primary anchor carrier.

In various embodiments, the terminal 120 may set a supportable frequency band to receive the IS. For example, based on the specifications of the terminal 120 and the like, the terminal 120 may predetermine a supportable frequency band. The supportable frequency band may differ from at least some of the frequency bands for a plurality of anchor carriers. For example, a plurality of anchor carriers may include an anchor carrier for a first frequency band and an anchor carrier for a second frequency band. The frequency band that the terminal 120 can support may be the first frequency band. The terminal 120 may determine that an anchor carrier for the first frequency band is an anchor carrier for receiving the IS.

In various embodiments, the terminal 120 may receive the IS through a frame for the anchor carrier. The ISs for the respective anchor carriers may be included in at least one subframe. For example, the IS may be included in a single subframe. As another example, at least a portion of the IS may be separated to then be included in different subframes. In some embodiments, the terminal 120 may receive the IS through a single subframe. In some other embodiments, the terminal 120 may receive the IS through a plurality of subframes.

In various embodiments, based on at least one of information on a plurality of anchor carriers, information on the carriers that the terminal 120 supports, the strength of the signal determined through RRM measurement (here, the signal may include a signal in relation to the carrier), or the power consumption of terminal 120, the terminal 120 may determine anchor carriers for receiving the ISs. Some of the detailed implementation will be shown in FIG. 12.

Hereinafter, although a plurality of anchor carriers will be referred as a "set of anchor carriers" for the convenience of description in the present disclosure, the present disclosure is not limited thereto. The plurality of anchor carriers determined by the base station 110 may be referred to using various terms corresponding to a term having a technical meaning equivalent to "set of anchor carriers". In addition, the anchor carrier of the present disclosure may be referred to using various terms having technical meanings equivalent to terms referring to a carrier used for transmission of a control signal, such as a control carrier, a control signal carrier, an anchor carrier wave, or an anchor frequency band, and is not limited to the terms described in the present disclosure.

Figure 6:
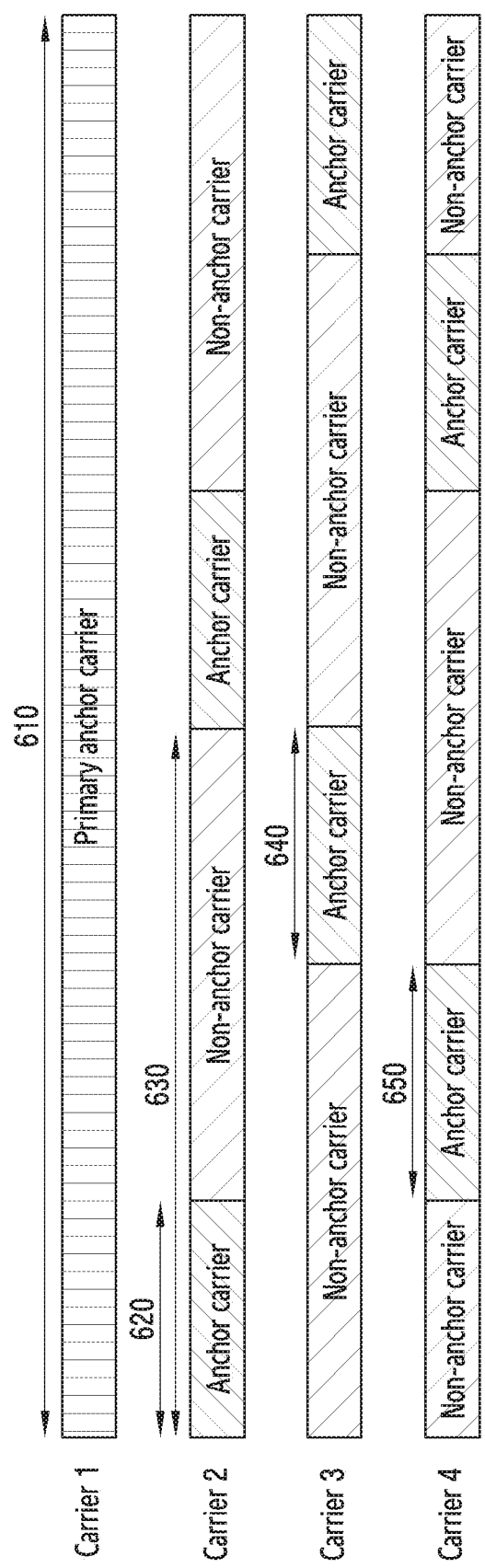
FIG. 6 illustrates an example of a plurality of anchor carriers including a primary anchor carrier according to various embodiments.

FIG. 6 illustrates an example of a plurality of anchor carriers including a primary anchor carrier according to various embodiments. Referring to FIG. 6, respective bars corresponding to the respective carriers indicate whether or not the carriers perform an anchor carrier function over time.

The base station 110 may transmit, to the terminal 120, information on a plurality of carriers that can operate as anchor carriers. For example, the plurality of carriers may include Carrier 1, Carrier 2, Carrier 3, and Carrier 4. Each of a plurality of carriers may indicate a predetermined frequency band. The execution of an anchor carrier function may mean that the signal can be transmitted through the corresponding frequency band.

According to various embodiments, a plurality of carriers may include a primary anchor carrier fixed to a single carrier. For example, the base station 110 may set Carrier 1 as a primary anchor carrier. That is, even though other anchor carriers are occupied by other nodes, the base station 110 or the terminal 120 may transmit the IS through a single fixed primary anchor carrier (e.g., Carrier 1). The IS may include information on anchor carriers other than Carrier 1, and the terminal 120 may determine other anchor carriers by identifying the IS through Carrier 1. The frequency band corresponding to Carrier 1 is semi-persistently allocated as a primary anchor carrier, so that the terminal 120 in the idle state may receive the IS without a separate procedure of searching for the anchor carrier.

In various embodiments, the primary anchor carrier may be fixed to Carrier 1. For example, Carrier 1 may be set as a primary anchor carrier during an interval 610. The interval 610 may indicate that the frequency band is semi-persistently allocated to Carrier 1. In some embodiments, the interval 610 may include the entire interval in which the base station 110 and the terminal 120 are connected. That is, when the base station 110 and the terminal 120 are connected, the interval 610 may indicate the interval of the total period in which the connection is maintained. Whether or not the remaining carriers, except for the primary anchor carrier, among the plurality of carriers, operate as anchor carriers may vary depending on time. For example, Carrier 2 to Carrier 4 may be set as anchor carriers or as non-anchor carriers over time.

In various embodiments, Carrier 2 may include an anchor carrier capable of transmitting an IS during the time corresponding to an interval 620. Carrier 2 may be set as an anchor carrier capable of transmitting an IS from the base station 110 to the terminal 120 according to a specific time interval 630 (or a predetermined time period) (hereinafter, referred to as a "setting period"). Carrier 3 may include an anchor carrier capable of transmitting an IS during the time corresponding to a time interval 640. Carrier 3 may be set as an anchor carrier capable of transmitting an IS from the base station 110 to the terminal 120 during a specific setting period. Carrier 4 may include an anchor carrier capable of transmitting an IS during the time corresponding to a time interval 650. Carrier 4 may be set as an anchor carrier capable of transmitting an IS from the base station 110 to the terminal 120 at regular time intervals. The time for performing the anchor carrier function in the setting period may vary depending on carriers, but is not limited to the embodiment shown in FIG. 6.

The time intervals included in Carrier 2, Carrier 3, or Carrier 4 may include intervals for non-anchor carriers, as well as intervals for anchor carriers (e.g., the interval 620). The interval for an anchor carrier means an interval which is set for the corresponding carrier to transmit an IS between the base station 110 and the terminal 120. The interval for a non-anchor carrier means an interval that is not set as an anchor carrier. For example, the interval for a non-anchor carrier may mean an interval during which downlink data, as a signal other than the IS, can be transmitted. As another example, the interval for a non-anchor carrier may refer to an interval during which a signal based on another communication system is transmitted. For example, the signal based on another communication system may be a Wi-Fi signal transmitted from an AP.

In various embodiments, when the terminal 120 operates in an idle state {e.g., radio resource control (RRC) IDLE}, the terminal 120 may periodically access at least one of a plurality of anchor carriers in order to receive a paging message. A plurality of anchor carriers may include a primary anchor carrier. The terminal 120 may normally receive a paging message transmitted by the base station 110 by monitoring the primary anchor carrier every paging cycle. According to an embodiment, the primary anchor carrier may be a band in which the DFS is not performed. The terminal 120 may access a cell (e.g., cell reselection) by monitoring the primary anchor carrier.

In some embodiments, the base station 110 may be fixed permanently, or may be configured to transmit an IS through a primary anchor carrier that lasts for a long time. The base station 110 may maintain the primary anchor carrier even when changing the set of anchor carriers. Accordingly, the terminal 120 may identify information on the set of anchor carriers through the primary anchor carrier without a separate procedure for searching for an anchor carrier. That is, the overhead for anchor carrier searching may be reduced by using the primary anchor carrier.

Figure 7:
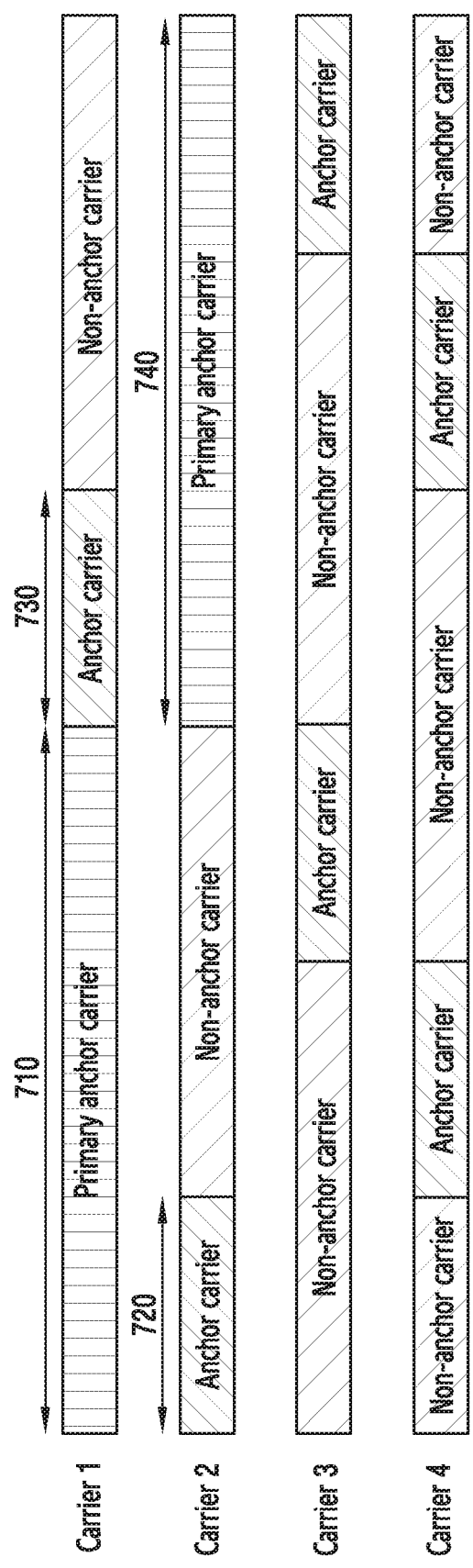
FIG. 7 illustrates another example of a plurality of anchor carriers including a primary anchor carrier according to various embodiments.

FIG. 7 illustrates another example of a plurality of anchor carriers including a primary anchor carrier according to various embodiments. The embodiment shown in FIG. 7 is intended to operate a primary anchor carrier, and a description the same as or similar to that of the embodiment shown in FIG. 6 will be omitted. The configurations shown in FIG. 7, which are the same as those shown in FIG. 6, may be described with reference to FIG. 6.

Referring to FIG. 7, respective bars corresponding to the respective carriers indicate whether or not the carriers perform an anchor carrier function over time. According to various embodiments, a plurality of carriers may include a primary anchor carrier that is adaptively set. For example, Carrier 1 may be set as a primary anchor carrier during an interval 710, and Carrier 2 may be set as a primary anchor carrier during an interval 740.

According to various embodiments, each of the plurality of carriers, based on a predetermined time interval (hereinafter, referred to as a "setting period"), may be set as an anchor carrier for transmitting an IS from the base station 110 to the terminal 120. For example, Carrier 1 may be set as a primary anchor carrier during the interval 710. The base station 110 may transmit an IS to the terminal 120 using Carrier 1 as a primary anchor carrier. Thereafter, Carrier 2 may be set as a primary anchor carrier during the interval

740. The base station may transmit an IS to the terminal 120 using Carrier 2 as a primary anchor carrier. Carrier 1 may be set as an anchor carrier (not a primary anchor carrier) during an interval 730 within the interval 740. That is, the base station 110 or terminal 120 may transmit an IS through at least one of Carrier 1 and Carrier 2 during the interval 730. In some embodiments, the time interval (a period of changing the primary anchor carrier) in which the carrier is set as a primary anchor carrier may be longer than a setting period of any carrier.

FIG. 7 illustrates a plurality of anchor carriers that the base station 110 transmits to the terminal 120 on a plurality of carriers according to various embodiments. The plurality of anchor carriers may include a primary anchor carrier and one or more anchor carriers. The primary anchor carrier and the one or more anchor carriers, based on predetermined time intervals, may transmit ISs from the base station 110 to the terminal 120. The time interval specified for the primary anchor carrier may be longer than the time intervals specified for the one or more anchor carriers.

FIGS. 4 to 7 have described methods of operating a primary anchor carrier, among a plurality of anchor carriers. The overhead of the terminal 120 may be reduced by setting a primary anchor carrier. Hereinafter, a procedure of transmitting/receiving information on anchor carriers between a base station and a terminal will be described with reference to FIGS. 8 to 16C.

Notification of Anchor Carrier Information

Figure 8:
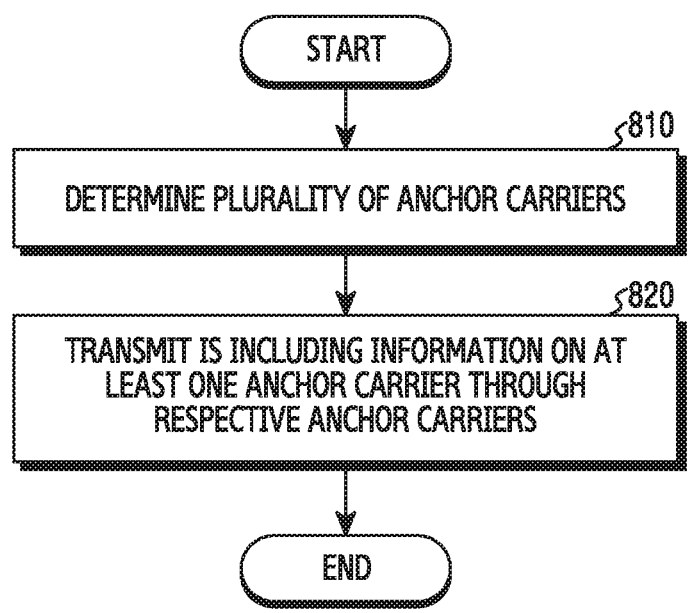
FIG. 8 is a flowchart of an operation in which a base station notifies a terminal of anchor carrier-related information according to various embodiments.

FIG. 8 is a flowchart of an operation in which a base station notifies a terminal of anchor carrier-related information according to various embodiments. Hereinafter, the anchor carrier-related information will be referred to as "anchor carrier information". The base station 110 and the terminal 120 in FIG. 1 will be illustrated as an example of a base station and a terminal, respectively.

In operation 810, the base station 110 may determine a plurality of anchor carriers. In various embodiments, the base station 110 may determine a plurality of carriers for transmitting ISs before performing an operation for communication. The determined carriers may be referred to as a "set of anchor carriers". Carriers for transmitting the ISs may be referred to as "anchor carriers".

In various embodiments, based on a determination of the number of anchor carriers and a determination of a frequency band to be used for transmission of the ISs, the base station 110 may determine a set of anchor carriers. In some embodiments, the base station 110, based on whether or not communication devices are located near the base station, may determine a set of anchor carriers.

In operation 820, the base station 110 may transmit an IS including information on at least one anchor carrier through each of a plurality of anchor carriers.

In various embodiments, the base station 110 may add information on an anchor carrier to the IS. That is, the IS may include information on the anchor carrier. In some embodiments, the information on the anchor carrier may include information on all the anchor carriers operated by the base station 110. In some other embodiments, the information on the anchor carrier may include information only about an anchor carrier that transfers information on the corresponding anchor carrier. In this case, the terminal 120 may identify whether or not the carrier used for transmission of the IS is being operated as an anchor carrier by means of the reception of the IS. A description related thereto will be made with reference to FIGS. 9A and 9B.

Figure 9A:
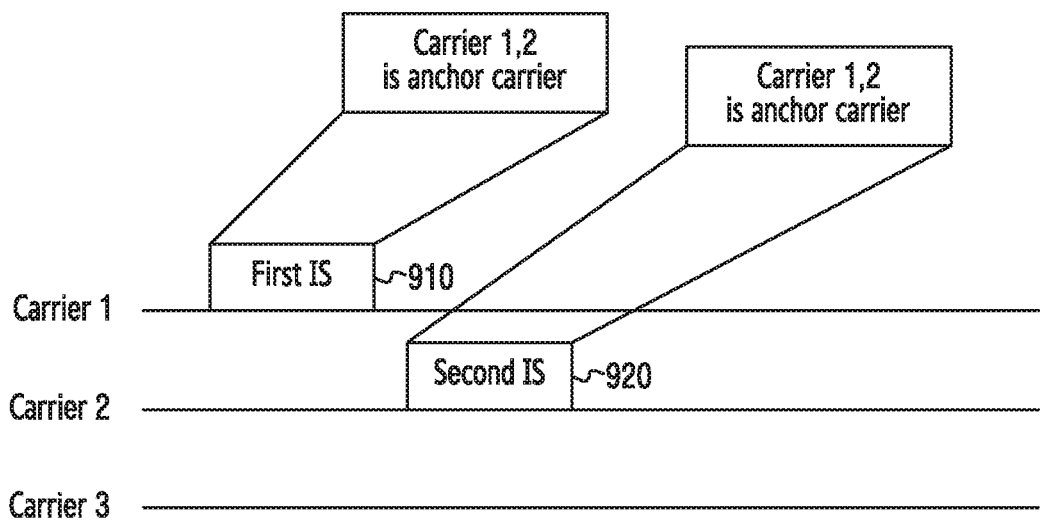
FIG. 9A illustrates an example of anchor carrier information included in an information signal (IS) according to various embodiments.

FIG. 9A illustrates an example of anchor carrier-related information included in an information signal (IS) according to various embodiments.

Referring to FIG. 9A, the base station 110 may determine that Carrier 1 and Carrier 2 are anchor carriers, respectively, among Carrier 1, Carrier 2, and Carrier 3. That is, a set of anchor carriers may include Carrier 1 and Carrier 2. The base station 110 may transmit a first IS 910 through Carrier 1, or may transmit a second IS 920 through Carrier 2. The base station 110 may transmit ISs through the respective anchor carriers included in the set of anchor carriers. Each IS may include information indicating a plurality of anchor carriers (i.e., information indicating a set of anchor carriers). For example, the first IS 910 of Carrier 1 may include information indicating Carrier 1 and Carrier 2, which are included in the set of anchor carriers. The second IS 920 of Carrier 2 may also include information indicating Carrier 1 and Carrier 2. That is, even if the terminal 120 receives an IS through only one of the plurality of anchor carriers, it may identify other anchor carriers and frequency bands of the respective anchor carriers.

Figure 9B:
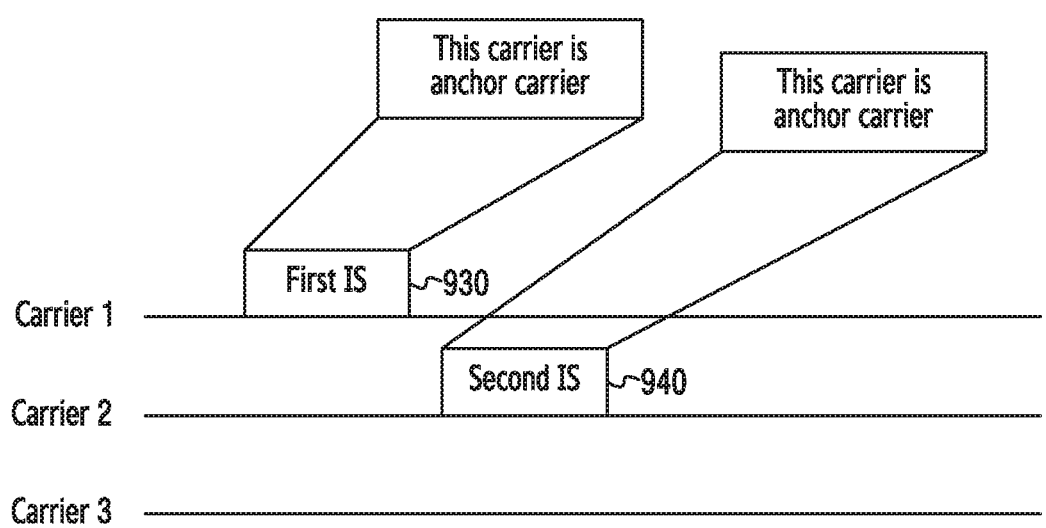
FIG. 9B illustrates another example of anchor carrier information included in an information signal according to various embodiments.

FIG. 9B illustrates another example of anchor carrier-related information included in an information signal according to various embodiments.

Referring to FIG. 9B, the base station 110 may determine that Carrier 1 and Carrier 2, among Carrier 1, Carrier 2, and Carrier 3, are anchor carriers. That is, a set of anchor carriers may include Carrier 1 and Carrier 2. The base station 110 may transmit a first IS 930 through Carrier 1, or may transmit a second IS 940 through Carrier 2. Each IS may represent each anchor carrier. For example, the first IS 930 of Carrier 1 may indicate that Carrier 1 is an anchor carrier. The second IS 940 for Carrier 2 may indicate that Carrier 2 is an anchor carrier. The terminal 120 may determine that each frequency band (e.g., Carrier 1 and/or Carrier 2) is an anchor carrier according to the reception of the respective ISs.

Figure 10A:
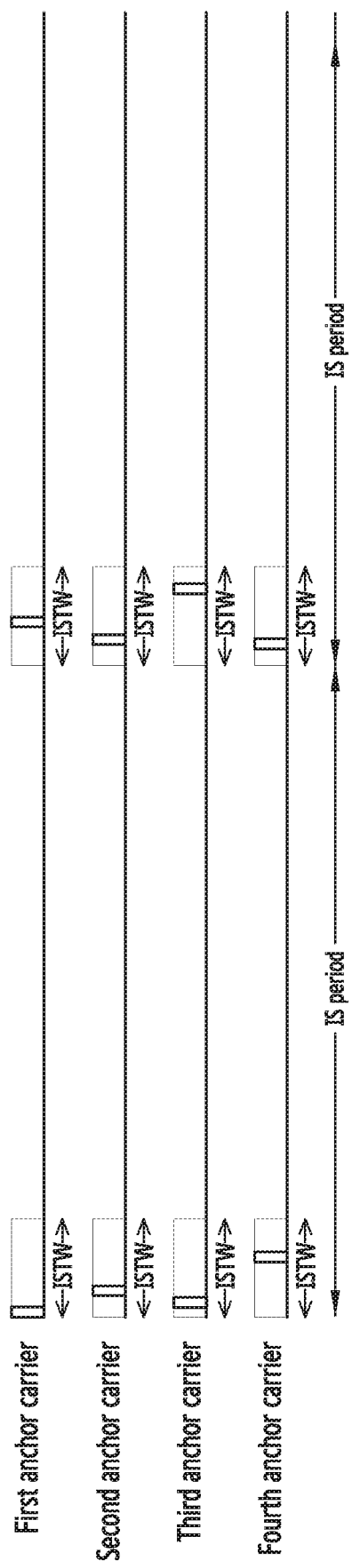
FIG. 10A illustrates an example of a time interval for transmitting an information signal according to various embodiments.

FIG. 10A illustrates an example of a time interval for transmitting an information signal (IS) according to various embodiments. Hereinafter, a time interval for transmitting an IS may be referred to as an "information signals transmission window (ISTW)".

Referring to FIG. 10A, the base station 110 may determine a plurality of anchor carriers (a first anchor carrier, a second anchor carrier, a third anchor carrier, and a fourth anchor carrier) in order to transmit the ISs. The base station 110 may transmit the ISs to the terminal 120 through the respective anchor carriers. The ISs may be transmitted from the base station 110 to the terminal 120 within the ISTWs. According to embodiments, the ISTWs may be predetermined by the base station 110, and the ISTWs may exist every IS period.

In various embodiments, the ISTWs for the first anchor carrier, the second anchor carrier, the third anchor carrier, and the fourth anchor carrier may be the same time interval. That is, the base station 110 may transmit information indicating a plurality of anchor carriers within one ISTW.

In various embodiments, the base station 110 may transmit the ISs in at least some of the ISTWs. In some embodiments, the first anchor carrier, the second anchor carrier, the third anchor carrier, and the fourth anchor carrier may be different from each other in at least some of the ISTWs for a plurality of anchor carriers in which the ISs are transmitted. Although it is not shown in the drawing, in some other embodiments, at least some intervals of the ISTWs of two or more anchor carriers for transmitting ISs may include the same time interval.

Figure 10B:
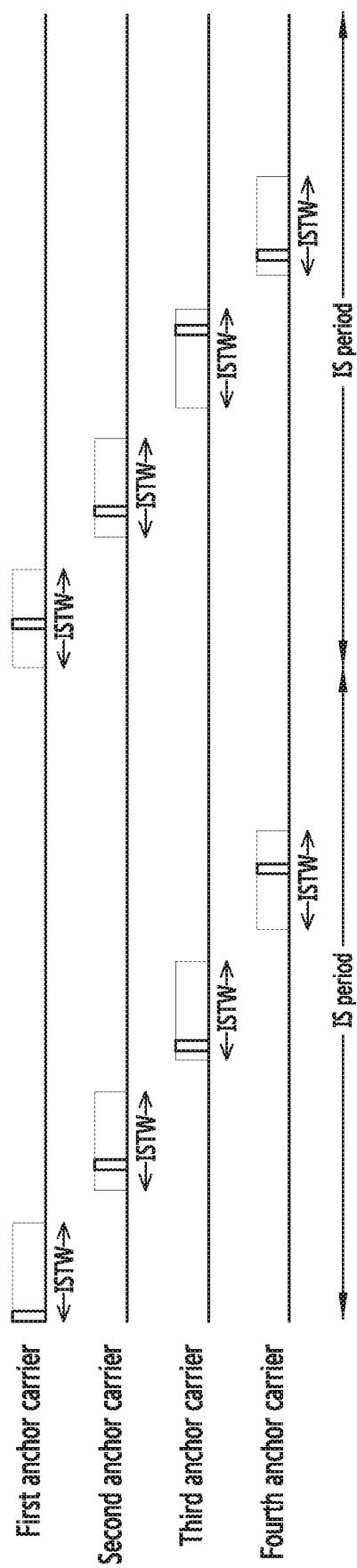
FIG. 10B illustrates another example of a time interval for transmitting an information signal according to various embodiments.

FIG. 10B illustrates another example of a time interval for transmitting an information signal from a base station to a terminal according to various embodiments. Descriptions the same as or similar to those made in connection with the embodiment shown in FIG. 10A will be omitted. The description of FIG. 10A may be applied to the configurations shown in FIG. 10B, which are the same as those shown in FIG. 10A.

Referring to FIG. 10B, the base station 110 may determine a plurality of anchor carriers (a first anchor carrier, a second anchor carrier, a third anchor carrier, and a fourth anchor carrier) for transmitting ISs. The base station 110 may transmit the ISs to the terminal 120 through the respective anchor carriers. The ISs may be transmitted from the base station 110 to the terminal 120 within the ISTWs.

Referring to FIG. 10B, in various embodiments, the base station 110 may distribute the ISTWs of the first anchor carrier, the second anchor carrier, the third anchor carrier, and the fourth anchor carrier so as not to overlap each other. According to an embodiment, when at least one anchor carrier is congested, the base station 110 may transmit the ISs through non-overlapping ISTWs. Thus, the base station 110 may transmit the ISs through other anchor carriers, which ensures stable transmission of the ISs. The base station 110 may prevent the overhead of a wireless communication system, and may increase the interval in which the terminal 120 can receive the ISs by distributing the times at which the ISs are transmitted.

Figure 11:
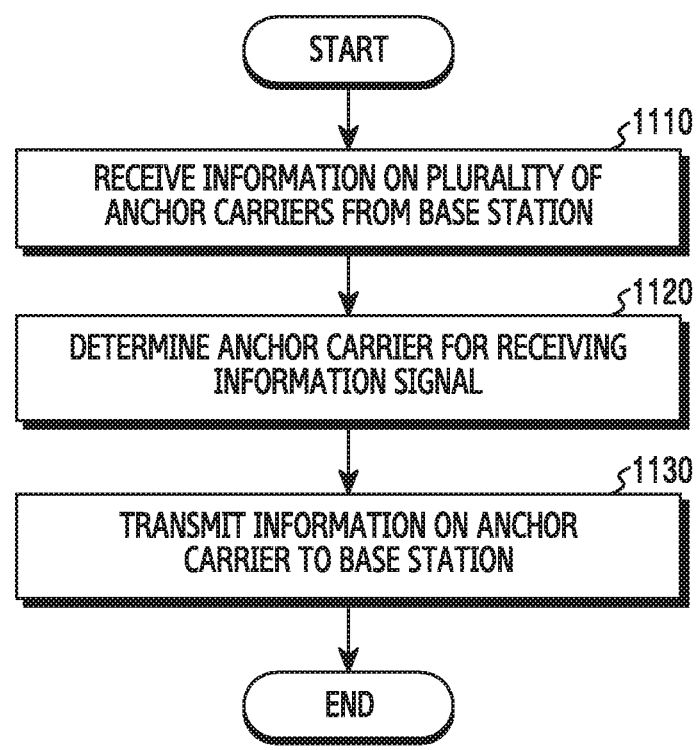
FIG. 11 is a flowchart of the operation of a terminal to determine anchor carriers according to various embodiments.

FIG. 11 is a flowchart of the operation of a terminal to determine anchor carriers for receiving ISs according to various embodiments. The terminal may correspond to the terminal 120 in FIG. 1.

In operation 1110, the terminal 120 may receive information on a plurality of anchor carriers from the base station 110. The information may include information indicating respective frequency bands assigned to the plurality of anchor carriers. According to embodiments, operation 1110 may correspond to operation 510 in FIG. 5.

In operation 1120, the terminal 120 may determine anchor carriers for receiving the ISs. In various embodiments, the carriers that the terminal 120 can support may be predetermined. The terminal 120 may identify information on a plurality of anchor carriers operated by the base station 110. The terminal 120 may determine whether or not at least some of the plurality of anchor carriers are supportable. The terminal 120 may determine that the supportable carriers, among the plurality of anchor carriers, are anchor carriers for receiving the information signals. If there are a plurality of supportable carriers, among the plurality of anchor carriers, the channel qualities for the respective carriers may be identified. The terminal 120 may identify the carrier having the best channel quality, and may determine that the carrier having the best channel quality is an anchor carrier for receiving the information signals.

In various embodiments, the terminal 120 may receive information on the plurality of anchor carriers, and may identify the received information. In some embodiments, the channel qualities may be different between the plurality of anchor carriers. The terminal 120 may determine that an anchor carrier having the best channel quality, among the plurality of anchor carriers having different channel qualities, is an anchor carrier for receiving the IS.

In operation 1130, the terminal 120 may transmit information on an anchor carrier to the base station 110. The anchor carrier may be at least one of a plurality of anchor carriers supported by the base station 110. The anchor carrier may be a carrier for transmitting the IS from the base station 110 to the terminal 120.

Figure 12:
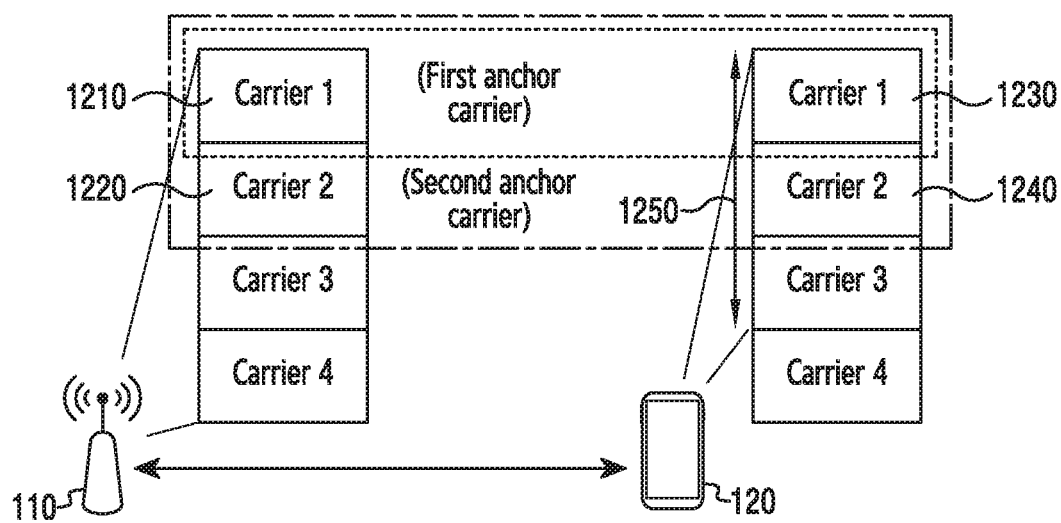
FIG. 12 illustrates an example of determining anchor carriers according to various embodiments.

FIG. 12 illustrates an example of an operation of determining anchor carriers for receiving ISs according to various embodiments. Referring to FIG. 12, the base station 110 may operate a plurality of anchor carriers (e.g., an anchor carrier 1210 and an anchor carrier 1220). The terminal 120 may support a frequency band 1250. The frequency band 1250 may include Carrier 1, Carrier 2, and Carrier 3.

The terminal 120 may receive information on a first anchor carrier 1210 and a second anchor carrier 1220 from the base station 110. The terminal 120 may determine whether or not the first anchor carrier 1210 and the second anchor carrier 1220 are supportable. In other words, the terminal 120 may determine whether or not the first anchor carrier 1210 and the second anchor carrier 1220 are included in the range of a frequency band that can be supported.

Referring to FIG. 12, the first anchor carrier 1210 may correspond to Carrier 1 (1230), and the second anchor carrier 1220 may correspond to Carrier 2 (1240). That is, the first anchor carrier 1210 and the second anchor carrier 1220 may be included in the range of a frequency band that can be supported by the terminal 120.

In various embodiments, the terminal 120 may measure channel quality in order to determine at least one anchor carrier for receiving an IS. The terminal 120 may determine an anchor carrier having the best channel quality by means of the measurement. The terminal 120 may determine that the anchor carrier having the best channel quality is an anchor carrier for receiving the IS. In some embodiments, the channel quality may be determined based on the strength of at least one signal received through the carrier. In some other embodiments, the channel quality may be determined based on various indicators in relation to the performance of the carrier. The channel quality may be referred to as "carrier quality", "carrier performance", or "channel performance", and is not limited to the above-described example.

Figure 13A:
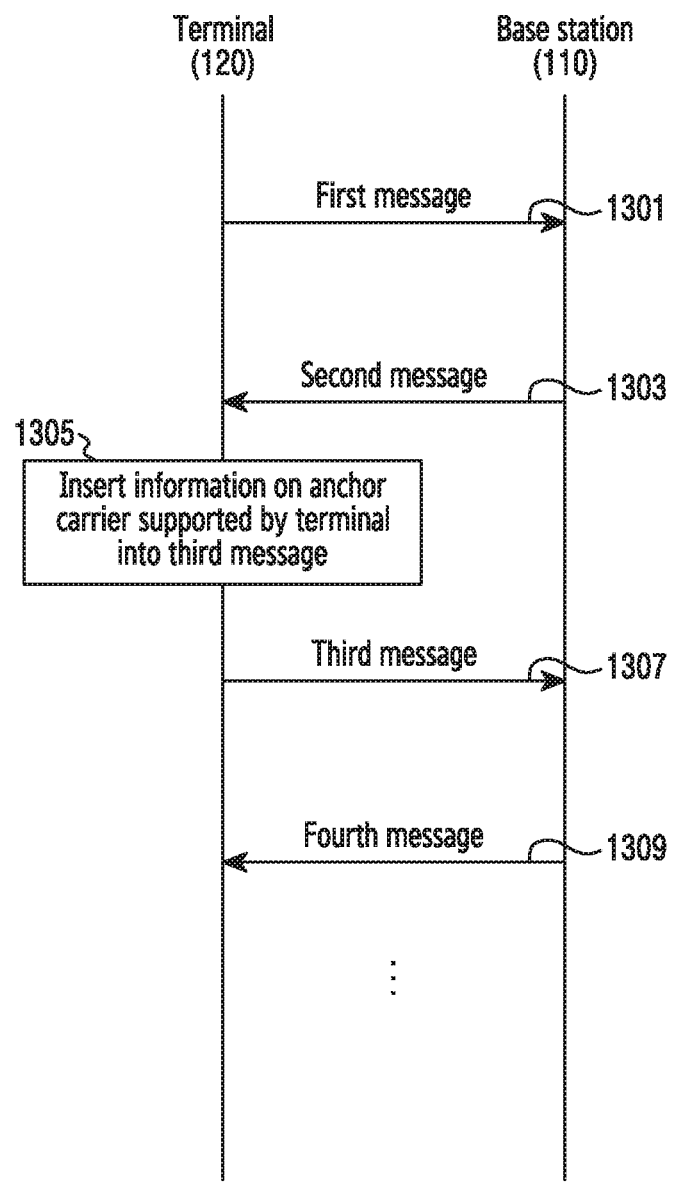
FIG. 13A illustrates an example of a signal flow for transmitting information on a carrier supported by a terminal to a base station according to various embodiments.

FIG. 13A illustrates an example of a signal flow for transmitting information on a carrier supported by a terminal to a base station according to various embodiments. The terminal 120 may perform random access (RA) in order to access the base station 110. The terminal 120 may notify the base station 110 of information on the carriers supported by the terminal during the execution of the RA.

In operation 1301, the terminal 120 may transmit a random access preamble {hereinafter, referred to as a "first message" (msg 1)} to the base station 110. The random access preamble may be the information transmitted from the terminal 120 to the base station 110 before initiating the RA. The base station 110 may identify the RA initiation by the reception of the random access preamble.

In operation 1303, the base station 110 may transmit a random access response (RAR) {hereinafter, referred to as a "second message" (msg 2)} to the terminal 120. The random access response may be the information that the base station 110 transmits to the terminal 120 in response to the reception of the first message. The base station 110 may provide the terminal with resource information for transmission of a third message, which will be described later, through the second message.

In operation 1305, the terminal 120 may insert information into a Radio Resource Control (RRC) connection request message {hereinafter, referred to as a "third message" (msg 3)}. The information inserted into the third message may be the information on anchor carriers supported by the terminal. In some embodiments, the terminal 120 may identify supportable anchor carriers among a plurality of anchor carriers. The terminal 120 may transmit information on the supportable anchor carriers to the base station 110. The terminal 120 may use the third message in order to transmit information on the supportable anchor carriers. In some other embodiments, the terminal 120 may identify supportable anchor carriers among a plurality of anchor carriers. The terminal 120 may determine at least some of the supportable anchor carriers in order to receive ISs. The terminal 120 may transmit, to the base station 110, information on the anchor carriers determined to receive the ISs. The terminal 120 may use the third message for transmission of the information on the anchor carriers determined to receive the ISs.

In operation 1307, the terminal 120 may transmit the third message to the base station 110. Using the third message, the terminal 120 may make a request to the base station 110 for an RRC connection, and may provide the base station 110 with information on the anchor carriers supported by the terminal 120. In some embodiments, the terminal 120 may transmit information on the supportable anchor carriers to the base station 110 along with the third message or before transmitting the third message after receiving the second message. The terminal 120 may transmit information on the supportable anchor carriers to the base station 110 before receiving a fourth message after transmitting the third message.

In various embodiments, the base station 110 may identify the information on the anchor carriers supported by the terminal 120 in response to the reception of the third message. The base station 110 may identify the information on the supportable anchor carriers during the execution of the RA, and may then perform LBT. In some embodiments, if there are a plurality of anchor carriers supported by the terminal, the base station 110 may simultaneously initiate the execution of the LBT in the respective anchor carriers. In some other embodiments, the base station 110 may initiate the execution of the LBT in the predetermined order in the respective anchor carriers. Since the LBT is executed in a plurality of anchor carriers, the connection speed between the terminal 120 and the base station 110 may be increased.

In operation 1309, the base station 110 may transmit a fourth message (msg 4) to the terminal 120 in response to the reception of the third message. The fourth message may include a message for an RRC connection set-up. The execution of the RA may be completed based on the transmission of the fourth message to the terminal 120.

Figure 13B:
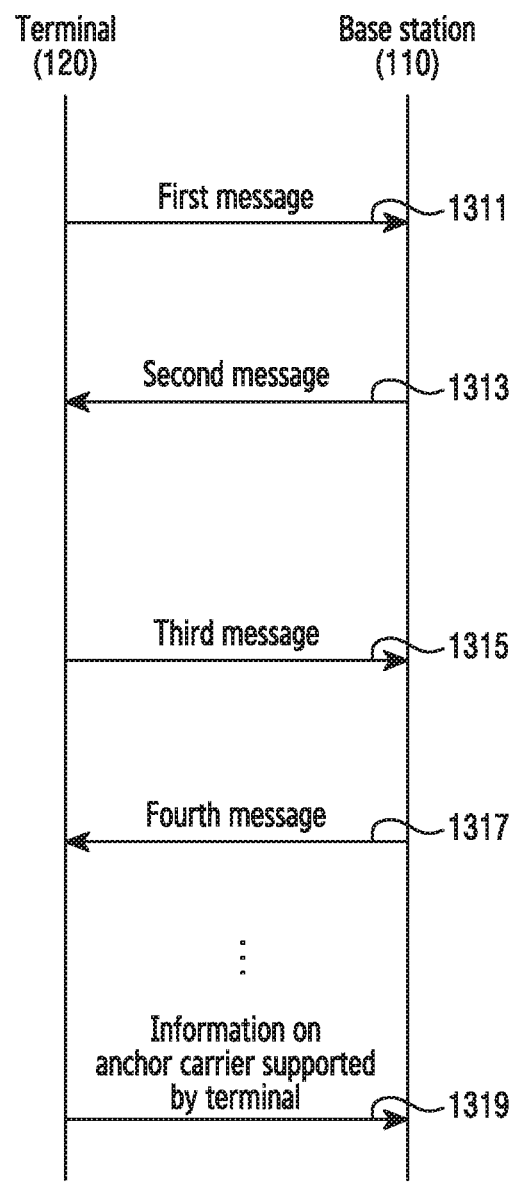
FIG. 13B illustrates another example of a signal flow for transmitting information on a carrier supported by a terminal according to various embodiments.

FIG. 13B illustrates another example of a signal flow for transmitting information on carriers supported by a terminal according to various embodiments. Operations 1311, 1313, 1315, and 1317 may correspond to operations 1301, 1303, 1307, and 1309, respectively. The description of the same or similar operations will be omitted.

In operation 1319, the terminal 120 may transmit information on anchor carriers supported by the terminal 120 to the base station 110 after the RA is terminated. In some embodiments, the information on the supportable anchor carriers may be transmitted from the terminal 120 to the base station 110 immediately after completion of the RA. In some other embodiments, the information on the supportable anchor carriers may be transmitted from the terminal 120 to the base station 110 after the lapse of a predetermined amount of time from the termination of the RA. The base station 110 may perform LBT after identifying information on the anchor carriers supported by the terminal 120.

Figure 14A:
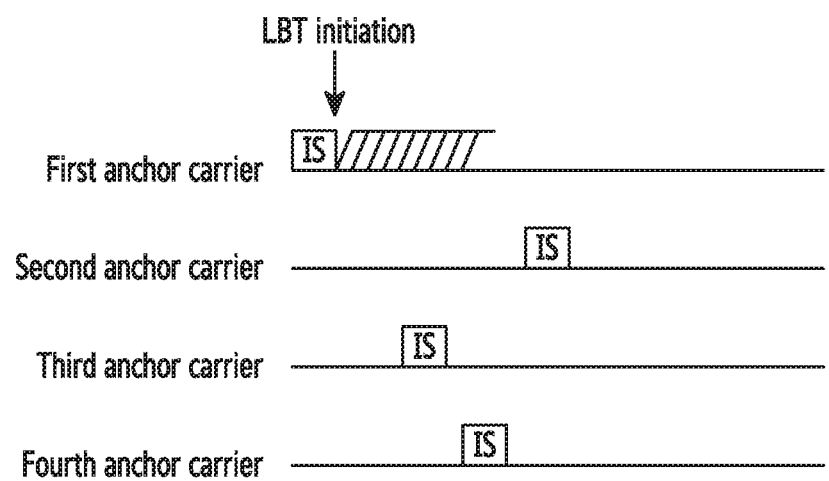
FIGS. 14A, 14B, and 14C illustrate examples of random access (RA) according to various embodiments.
Figure 14B:
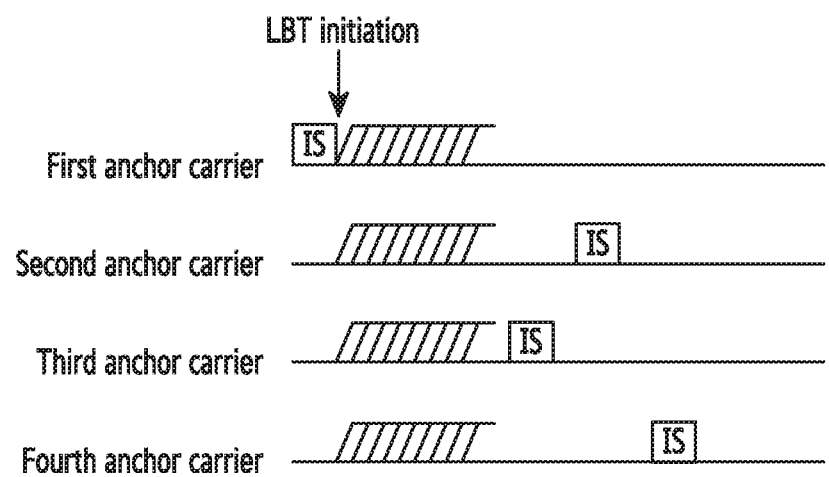
Figure 14C:
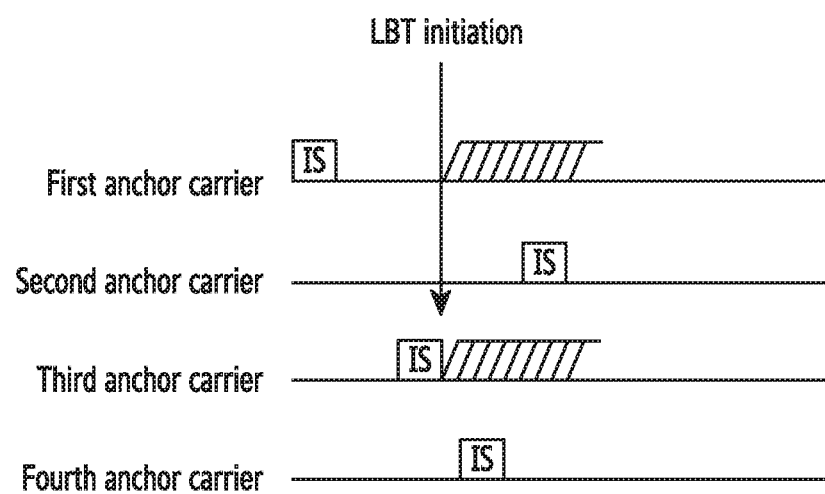

FIGS. 14A, 14B, and 14C illustrate examples of RA according to various embodiments.

FIGS. 14A to 14C illustrate operations for quickly performing the RA.

FIG. 14A shows an example in which respective ISs include information on respective anchor carriers. The respective anchor carriers may refer to carriers that transmit the respective ISs. A received IS may include only information on the anchor carrier including the received IS. In this case, the time at which the terminal 120 initiates the RA to access the base station 110 may be the time at which the IS is received. The RA initiation times of the respective anchor carriers may be different depending on the time of receiving the IS. In some embodiments, the terminal 120 may initiate the RA in the respective anchor carriers in response to reception of the ISs for the respective anchor carriers. The terminal 120 may initiate LBT in order to perform the RA in the respective anchor carriers.

Referring to FIG. 14A, when receiving an IS through a first anchor carrier, the terminal 120 may perform LBT in the first anchor carrier. In this case, the terminal 120 may not perform the LBT in a second anchor carrier, a third anchor carrier, and a fourth anchor carrier through which the IS has not been received.

FIG. 14B shows an example in which respective ISs include information on a plurality of anchor carriers. The information on a plurality of anchor carriers may be referred to as information on a set of anchor carriers.

In various embodiments, the base station 110 may insert information on a set of anchor carriers into the IS. In some embodiments, the base station 110 may transmit, to the terminal 120, information on the set of anchor carriers along with the IS. The terminal 120 may receive the IS, and may identify information on the set of anchor carriers through the received IS. For example, the terminal 120 may receive a single IS, and may decode the received IS. By means of the decoded IS, the terminal 120 may identify a plurality of anchor carriers included in the set of anchor carriers.

Referring to FIG. 14B, the terminal 120 may receive the IS through the first anchor carrier. The IS may include information on a set of anchor carriers. The terminal 120 may decode the received IS. Based on the decoded IS, the terminal 120 may identify a plurality of anchor carriers operated by the base station 110. The terminal 120 may perform RA in the respective anchor carriers without receiving the respective ISs through the respective anchor carriers operated by the base station 110. The terminal 120 may initiate LBT to perform the RA in the respective anchor carriers.

FIG. 14C illustrates an example in which the initiation of RA is determined based on the number of received ISs. Referring to FIG. 14C, the terminal 120 may identify the number of received ISs in order to determine the time to initiate the execution of RA of an anchor carrier. In some embodiments, the terminal 120 may sequentially receive ISs of the respective anchor carriers. The respective ISs may include information on the respective anchor carriers. The terminal 120 may determine the initiation time of LBT in response to detection of a predetermined number of ISs. For example, the terminal 120 may receive a first IS through a first anchor carrier. The terminal 120 may receive a second IS through a third anchor carrier. Thereafter, the terminal 120 may perform LBT in the first anchor carrier and the second anchor carrier, irrespective of whether or not the IS is received. Although it is not shown in the drawing, in some other embodiments, at least some of the ISs for a plurality of anchor carriers may be received at the same time. The terminal 120 may identify the two ISs, which have been received first, and may initiate the LBT for the anchor carriers corresponding to the ISs that are received first. In some other embodiments, if an IS for a single anchor carrier is initially received, and if ISs are simultaneously received through at least two anchor carriers thereafter, the LBT may be performed simultaneously in the at least two anchor carriers and the anchor carrier for the initially received IS.

Figure 15:
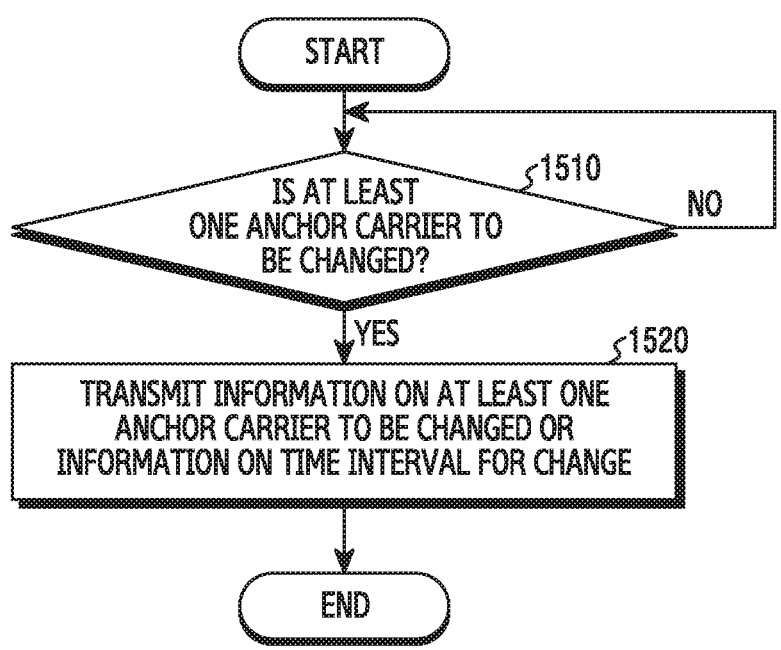
FIG. 15 is a flowchart of the operation of a base station for providing notification of a change in the anchor carrier according to various embodiments.

FIG. 15 is a flowchart of the operation of a base station for providing notification of a change in the anchor carrier according to various embodiments.

Referring to FIG. 15, in operation 1510, the base station 110 may determine whether or not to correct at least one anchor carrier. For example, the base station 110, based on the placement of nearby communication devices, a traffic change, and/or a change in the channel environment, may determine whether or not to change at least one anchor carrier.

If the anchor carrier is required to be changed, the base station 110 may perform operation 1520. If the anchor carrier is not required to be changed, the base station 110 may perform operation 1510 again. According to various embodiments, a period for determining whether or not to change the anchor carrier may be set by the base station 110. The period for determining whether or not to change the anchor carrier may mean a specific time interval, and is not limited to the above-described example. For example, the base station 110 may determine whether or not to change the anchor carrier every hour. The period for determining whether or not to change the anchor carrier may be changed by the base station 110. The period for determining whether or not to change the anchor carrier may mean a specific time interval, and is not limited to the above-described example.

In operation 1520, when it is determined to change at least one anchor carrier, the base station 110 may transmit, to the terminal 120, information on at least one anchor carrier to be changed or information on a time interval for change. In some embodiments, the information on at least one anchor carrier to be changed and the information on a time interval for change may be transmitted to the terminal 120 at the same time. In some other embodiments, the information on at least one anchor carrier to be changed and the information on a time interval for change may be sequentially transmitted to the terminal 120. For example, the base station 110 may transmit the information on at least one anchor carrier to be changed to the terminal 120 first. As another example, the base station 110 may transmit the information on a time interval for change to the terminal 120 first.

In various embodiments, the information on at least one anchor carrier to be changed may be transmitted to the terminal 120 in various manners. For example, based on an IS, a physical downlink control channel (PDCCH), and/or a paging message, the base station 110 may notify the terminal 120 of the information on at least one anchor carrier to be changed. The method of notification will be described with reference to FIGS. 16A, 16B, and 16C.

Figure 16A:
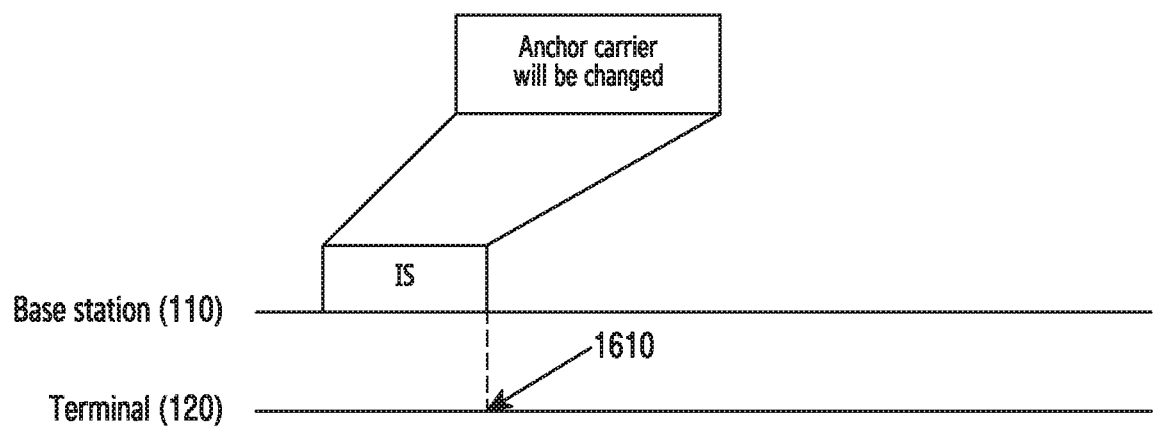
FIGS. 16A, 16B, and 16C illustrate examples of notification of a change in the anchor carrier according to various embodiments.
Figure 16B:
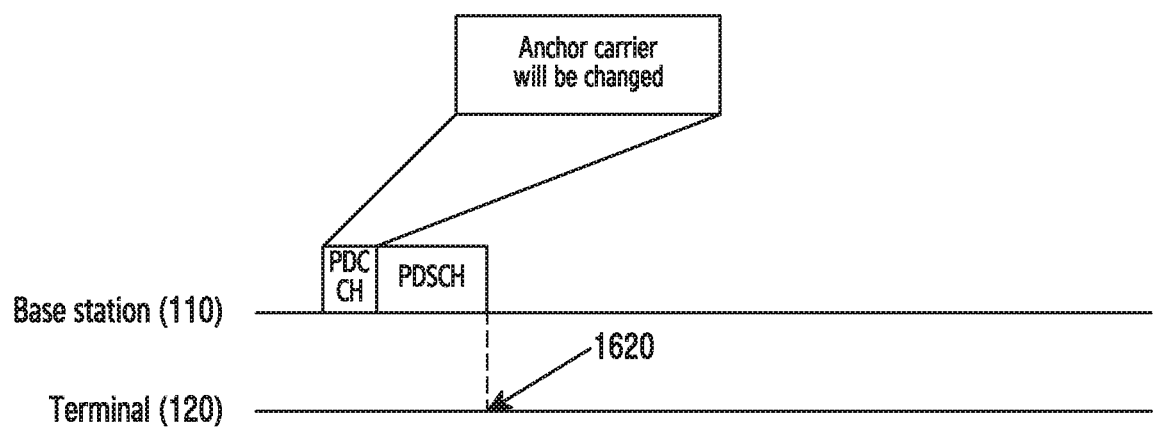
Figure 16C:
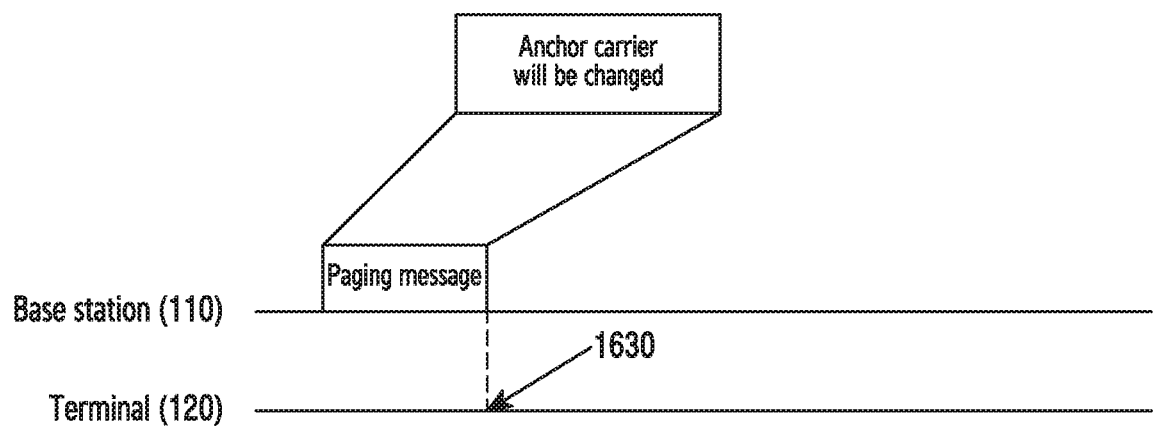

FIGS. 16A, 16B, and 16C illustrate examples of notification of a change in the anchor carrier according to various embodiments. In various embodiments, the base station 110 may determine whether or not to change the anchor carrier. If it is determined whether or not to change the anchor carrier, the base station 110 may transmit, to the terminal 120, information on a change in the anchor carrier and/or information on the time at which the change is to be performed. The information on the change in the anchor carrier may be intended to provide notification that the anchor carrier will be changed.

FIG. 16A illustrates an example of notification of a change in the anchor carrier using an IS. Referring to FIG. 16A, the notification of the change may be performed through the IS. For example, the IS may include information on whether or not to change the anchor carrier or information on the time at which the change is to be performed. As another example, the IS may include information on whether or not to perform correction and information on the time at which the change is performed.

In various embodiments, the terminal 120 may identify information on whether or not the anchor carrier is to be changed or information on the time at which the change is performed at the time 1610 at which the reception of the IS is completed. In some embodiments, the terminal 120 may identify information on whether or not the anchor carrier is to be changed and information on the time at which the change is performed at the time 1610 at which the reception of the IS is completed. The terminal 120, based on the identified information, may update the anchor carrier.

FIG. 16B illustrates an example of notification of a change in the anchor carrier using the PDCCH. Referring to FIG. 16B, in some embodiments, the base station 110 may perform insertion of information on determination or information on the time at which correction is performed through a PDCCH included in the anchor carrier. In some other embodiments, the base station 110 may transmit information on determination or information on the time at which correction is performed through a PDCCH included in the anchor carrier. The base station 110 may notify the terminal 120 of a change in the anchor carrier through the PDCCH. The base station 110 may transmit other data through a physical downlink shared channel (PDSCH) after notification of the change. The terminal 120 may identify whether or not the anchor carrier is to be changed at the time 1620 at which the reception of the PDCCH and the PDSCH is completed. The terminal 120, based on the identified information, may update the anchor carrier.

FIG. 16C illustrates an example of notification of a change in the anchor carrier using a paging message. The paging message may be transmitted to the terminal 120 through an anchor carrier. In various embodiments, the base station 110 may change the anchor carrier. In some embodiments, when it is determined to change the anchor carrier, the base station 110 may transmit, to the terminal 120, information on whether or not to change the anchor carrier or information on the time at which the correction is to be performed. In some other embodiments, when it is determined to change the anchor carrier, the base station 110 may transmit, to the terminal 120, information on whether or not to change the anchor carrier and information on the time at which the change is to be performed.

Referring to FIG. 16C, the information to provide notification that the anchor carrier is to be changed may be transmitted to the terminal 120 through a paging message. In some embodiments, if it is determined whether or not the anchor carrier is to be changed, the base station 110 may transmit information on the determination through a paging message. For example, the base station 110 may transmit, to the terminal 120, information stating that the anchor carrier's change will be performed through a paging message. In some other embodiments, when the anchor carrier is determined to be changed, the base station 110 may transmit information on the time at which the anchor carrier is changed through the paging message. In some other embodiments, the base station 110 may transmit, to the terminal 120, information on whether or not to change the anchor carrier and information on the time interval during which the change is performed along with the paging message. The terminal 120 may identify the information on the determination that the anchor carrier is to be changed or the information on the time at which the anchor carrier is changed at the time 1630 at which the reception of the paging message is completed. The terminal 120, based on the identified information, may update the anchor carrier.

Measurement of Channel Quality

Figure 17:
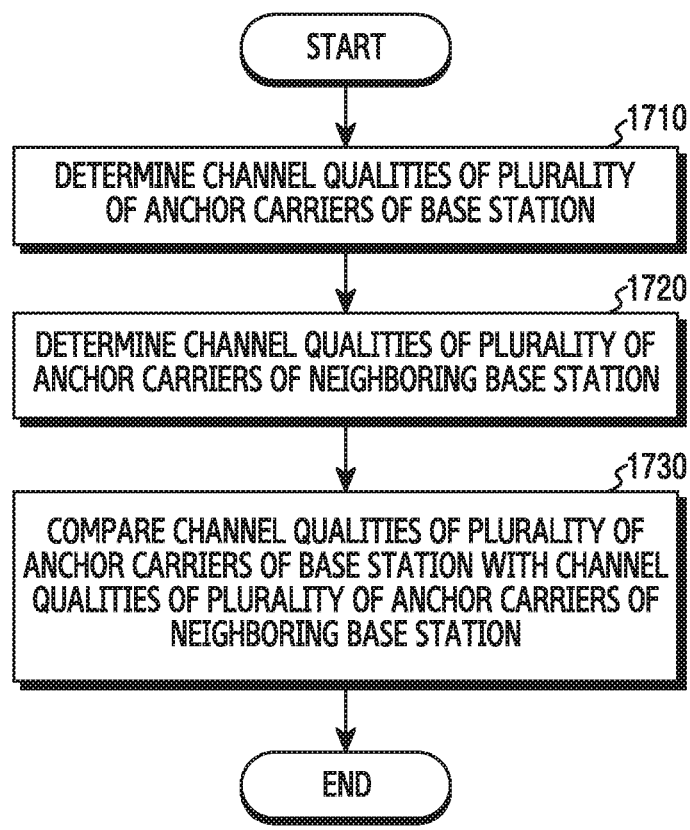
FIG. 17 is a flowchart illustrating an example of an operation of measurement by a terminal supporting multiple anchor carriers according to various embodiments.

FIG. 17 is a flowchart illustrating an example of a measurement operation by a terminal supporting multiple anchor carriers according to various embodiments. FIG. 17 illustrates a measurement operation for determining whether or not to perform handover of the terminal 120 when the terminal 120 includes in the coverage of a plurality of base stations. The terminal 120 may notify {e.g., provide a measurement report (MR)} the base station 110, which is a serving base station, of a measurement result {e.g., radio resource management (RRM)} in order to perform handover.

Referring to FIG. 17, in operation 1710, the terminal 120 may determine the channel qualities for a plurality of anchor carriers of the base station 110. Based on measurement of the cell of the base station 110, the terminal 120 may determine the channel qualities. The terminal 120 may periodically measure the cell. The terminal 120 may determine the channel qualities for the respective anchor carriers of the base station 110.

In various embodiments, the terminal 120 may receive at least one signal from the base station 110. The terminal 120 may measure the received signal, thereby determining the channel quality. Various indicators indicating the channel quality may be used for determining the channel quality. For example, the channel quality may be, in addition to reference signal received power (RSRP), at least one of reference signal received quality (RSRQ), a received signal strength indicator (RSRI), a signal-to-interference and noise ratio (SINR), a carrier-to-interference and noise ratio (CINR), a signal-to-noise ratio (SNR), an error vector magnitude (EVM), a bit error rate (BER), and a block error rate (BLER).

In various embodiments, the terminal 120 may determine a representative value of the channel qualities of a plurality of anchor carriers of the base station 110. In some embodiments, the terminal 120 may determine, as a representative value, an average of the channel qualities for a plurality of anchor carriers of the base station 110. In some other embodiments, the terminal 120 may determine, as a representative value, a weighted average of the channel qualities for a plurality of anchor carriers of the base station 110. In some other embodiments, the terminal 120 may determine, as a representative value, the total channel quality, which is the sum of the channel qualities of the respective anchor carriers of the base station 110. The terminal 120 may determine the channel qualities of the respective anchor carriers, and may determine the total sum of the determined channel qualities. The total channel quality may be determined based on the determined total sum. In some other embodiments, if there are three or more anchor carriers, the terminal 120 may determine, as representative values, the respective channel qualities of the top N anchor carriers, and N may be less than the total number of anchor carriers. For example, if there are four anchor carriers, the terminal 120 may determine, as a plurality of representative values, the channel qualities of the top two anchor carriers. In some other embodiments, if there are three or more anchor carriers, the terminal 120 may determine, as a representative value, an average value of the channel qualities of the top N anchor carriers. For example, if there are four anchor carriers, the terminal 120 may determine, as a representative value, an average value of the channel qualities of the top two anchor carriers. In some other embodiments, if there are three or more anchor carriers, the terminal 120, based on the remaining channel qualities excluding the highest channel quality and the lowest channel quality, may determine a representative value. The operation of determining the representative value may include various methods for determining a value representing the channel qualities of a plurality of anchor carriers, and is not limited to the above-described example.

In operation 1720, the terminal 120 may determine the channel qualities of a plurality of anchor carriers of a neighboring base station. In various embodiments, the terminal 120 may include in the coverage of another base station that is different from the base station 110 to which the terminal 120 is currently connected. Another base station may correspond to a neighboring base station, and the terminal 120 may determine the channel qualities for a plurality of anchor carriers of the neighboring base station. The operation of determining the channel qualities of the neighboring base station may be performed to correspond to the operation of determining the channel qualities of a plurality of anchor carriers of the base station 110. For example, in the case where the base station 110 determines the average channel quality of a plurality of anchor carriers, the terminal 120 may determine the average channel quality of a plurality of anchor carriers of the neighboring base station.

In operation 1730, the terminal 120 may compare the channel qualities of the plurality of anchor carriers of the base station 110 with the channel qualities of the plurality of anchor carriers of the neighboring base station. In various embodiments, the terminal 120 may compare the channel qualities of the base station 110 with the channel qualities of the neighboring base station, which have been determined in operations 1710 and 1720, respectively. In some embodiments, the terminal 120 may compare the channel qualities for the respective anchor carriers of the base station 110 with the channel qualities for the respective anchor carriers of the neighboring base station one to one. In some other embodiments, the terminal 120 may compare a representative value of channel quality for a plurality of anchor carriers of the base station 110 with a representative value of channel quality for a plurality of anchor carriers of the neighboring base station.

In various embodiments, the terminal 120 may transmit information on the comparison result of the channel quality to the base station 110. The terminal 120 may transmit, to the base station 110, information on the channel quality of the base station 110 or information on the channel quality of the neighboring base stations.

In various embodiments, the terminal 120 may compare the channel quality between the base station 110 and the neighboring base station. If a specified condition is satisfied, the terminal 120 may transmit information related to the comparison of the channel quality to the base station 110. For example, the terminal 120 may determine that the first channel quality related to the base station 110 is better than the second channel quality related to the neighboring base station. The terminal 120 may transmit, to the base station 110, at least one piece of information on the first channel quality, information on the second channel quality, or information on the determination.

Figure 18:
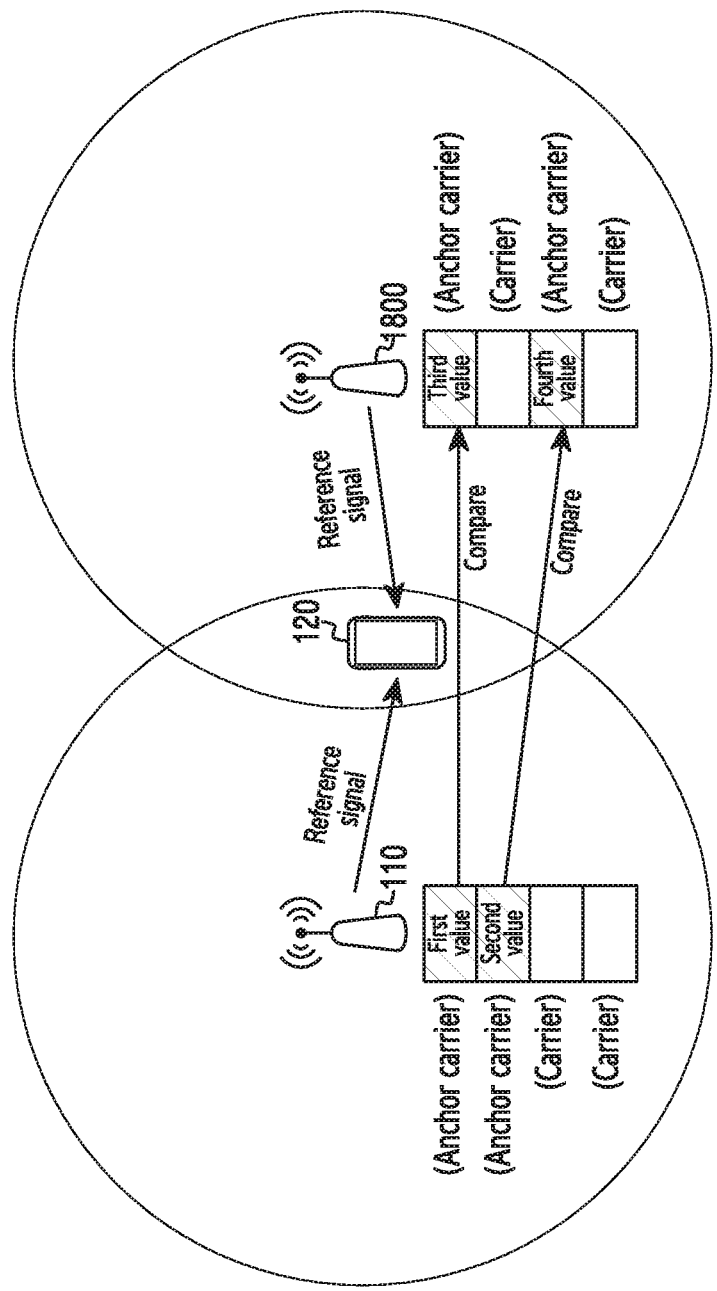
FIG. 18 illustrates an example of measurement of a terminal supporting multiple anchor carriers according to various embodiments.

FIG. 18 illustrates an example of measurement of a terminal supporting multiple anchor carriers according to various embodiments. Operations of determining and comparing the channel qualities for anchor carriers of base stations (the base station 110 and a neighboring base station 1800) will be described with reference to FIG. 18. In various embodiments, the terminal 120 may receive signals from the base stations. Here, the signals may be reference signals transmitted from the base stations. For example, the reference signal may be one of a cell-specific reference signal (CRS), a channel state information-reference signal (CSI-RS), and a demodulation-RS (DM-RS).

In various embodiments, the terminal 120 may determine the channel qualities (e.g., a first value and a second value) of a plurality of anchor carriers, which are received from the base station 110, and the channel qualities (e.g., a third value and a fourth value) of a plurality of anchor carriers, which are received from the neighboring base station 1800. At least one anchor carrier of a plurality of base stations (e.g., the base station 110 and the neighboring base station 1800) may include another band. For example, an anchor carrier having the channel quality of a second value may include a frequency band different from that of an anchor carrier having the channel quality of a fourth value.

Referring to FIG. 18, the terminal 120 may compare the first value with the third value. The terminal 120 may compare the second value with the fourth value. In some embodiments, the anchor carrier of the first value may be the same frequency band as the anchor carrier of the third value. If there are anchor carriers of the same frequency band, the terminal 120 may compare the channel qualities of the anchor carriers of the same frequency band with each other. In some other embodiments, the anchor carrier of the first value may be most similar to the anchor carrier of the third value. For example, the anchor carrier of the first value and the anchor carrier of the third value may not be identical, but may include overlapping frequency bands. In some other embodiments, the anchor carrier of the first value and the anchor carrier of the third value may be different. The anchor carrier of the first value and the anchor carrier of the third value may not include overlapping frequency bands. The terminal 120 may compare the respective anchor carriers by ordering the anchor carriers. The comparison of the second value and the fourth value may be performed in a manner the same as or similar to the comparison of the first value and the third value.

In various embodiments, the terminal 120 may determine a first representative value using the first value and the second value, and may determine a second representative value using the third value and the fourth value. The terminal 120 may compare the first representative value with the second representative value. The terminal 120 may transmit information in relation to the comparison to the base station 110. For example, if the second representative value is greater than the first representative value, the terminal 120 may provide the base station 110 with at least one piece of information on the first representative value, information on the second representative value, and information on the comparison result.

Figure 19:
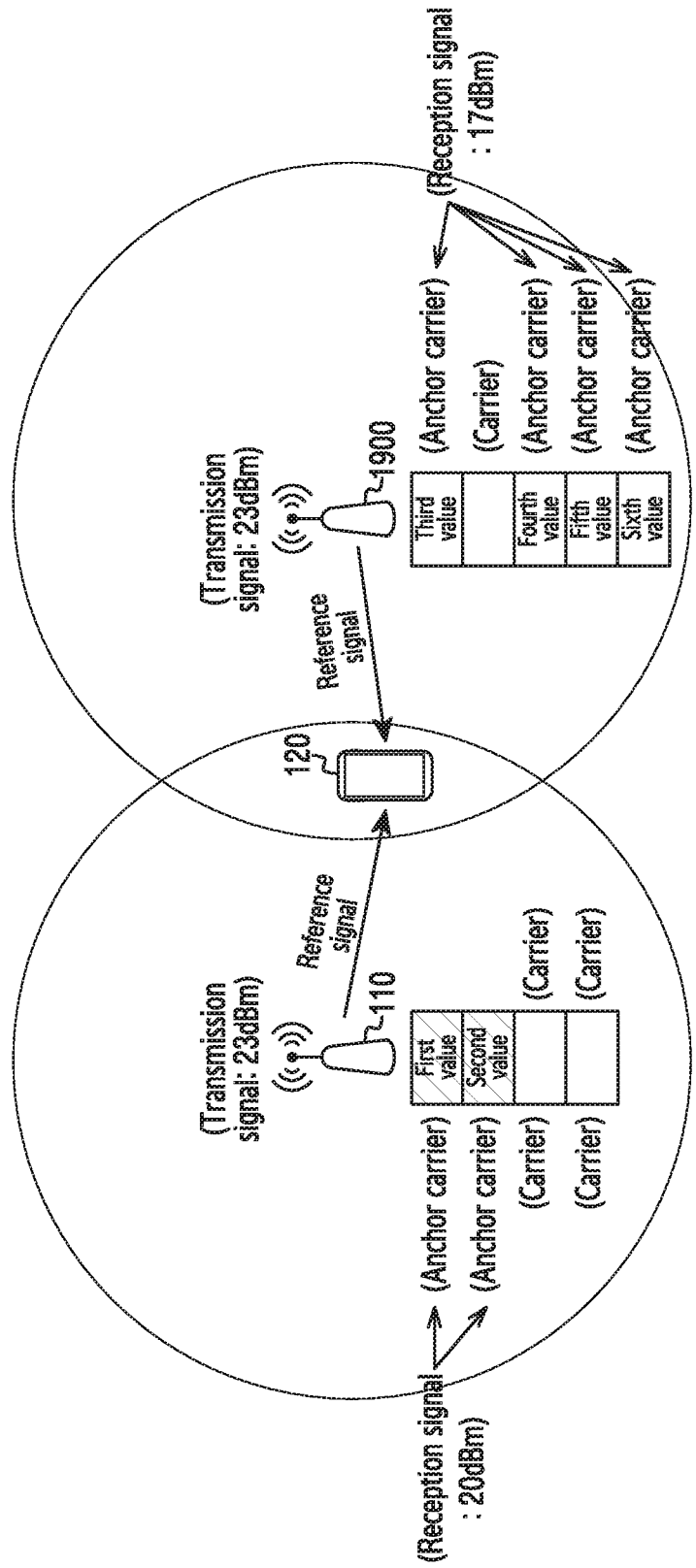
FIG. 19 illustrates another example of measurement of a terminal supporting multiple anchor carriers according to various embodiments.

FIG. 19 illustrates another example of measurement of a terminal supporting multiple anchor carriers according to various embodiments. FIG. 19 illustrates operations for determining and comparing the channel qualities for anchor carriers of the base stations 110 and 1800, and the description of FIG. 18 will be applied to the configuration of FIG. 19, which is the same as that of FIG. 18.

Referring to FIG. 19, the transmission power of anchor carriers is determined according to the number of anchor carriers to be operated. In various embodiments, the base station may determine the carrier operating power of a plurality of anchor carriers. The carrier operating power may be the total power that may be consumed by the base station to operate a plurality of anchor carriers. Based on the carrier operating power, the transmission power for each of a plurality of anchor carriers may be determined. The transmission power for each of the plurality of anchor carriers may differ depending on the number of anchor carriers. For example, the transmission power when the base station operates three anchor carriers may be different from the transmission power when the base station operates two anchor carriers.

In various embodiments, the base station 110 and a neighboring base station 1900 may have the same carrier operating power. If the base station 110 uses two anchor carriers, and if the neighboring base station 1900 uses four anchor carriers, the reception strength (e.g., 20 $dB_m$) of each of the two anchor carriers may be greater than the reception strength (e.g., 17 $dB_m$) of each of the four anchor carriers.

In various embodiments, the terminal 120 may correct the reception strengths for a plurality of anchor carriers in order to identify the carrier operating power of the base station. The terminal 120, based on a predetermined mathematical equation, may correct the reception strengths. For example, the terminal 120 may estimate the transmission strength from the reception strength using at least one of an arithmetic mean, a geometric mean, or a harmonic mean. Based on the corrected reception strengths, the terminal 120 may determine the channel qualities of the base station 110 and/or the neighboring base station 1900. Based on the determined channel qualities, the terminal 120 may compare the channel quality of the base station 110 with the channel quality of the neighboring base station 1900.

In various embodiments, when transmitting an IS, the base station (e.g., the base station 110 or the neighboring base station 1900) may transmit, to the terminal 120, information on the transmission strength of the base station or information on the number of anchor carriers transmitted by the base station through the IS. The terminal 120, based on the received information, may estimate the carrier operating power of the base station. The terminal 120 may determine the channel quality of the base station through the estimated carrier operating power. Based on the determined channel quality, the terminal 120 may determine the performance of the base station 110 and the neighboring base station 1900. For example, when the carrier operating power of the neighboring base station 1900 is greater than the carrier operating power of the base station 110, the terminal 120 may determine that the performance of the base station 110 is excellent. If it is determined that the channel quality of the neighboring base station 1900 is better than the channel quality of the base station 110, the terminal 120 may transmit, to the base station 110, information on the channel quality of the neighboring base station 1900 or information on the channel quality of the base station 110. The terminal 120 may transmit, to the base station 110, information on the channel quality (e.g., MR) for handover to the neighboring base station 1900. FIGS. 17 to 19 have described methods for measuring and comparing the channel qualities of the respective anchor carriers of a plurality of base stations. The control signal can be stably transmitted in a band having excellent performance by comparing the channel qualities.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   receiving, from a base station (BS), information on a plurality of anchor carriers of unlicensed frequency band;
   identifying, from the plurality of anchor carriers, at least one anchor carrier supported by the terminal;
   identifying a primary anchor carrier among the at least one anchor carrier; and
   receiving, from the base station (BS), an information signal (IS) for control in the unlicensed frequency band through the identified primary anchor carrier,
   wherein the primary anchor carrier is corresponding to a continuously maintained frequency band to receive the information signal from the base station.

2. The method of claim 1, wherein the IS comprises information indicating the at least one anchor carrier.

3. The method of claim 1, further comprising:
   determining channel qualities of the plurality of anchor carriers related to the base station;
   determining channel qualities of a plurality of other anchor carriers related to another base station; and
   transmitting measurement information on the another base station to the base station on the basis of the channel qualities of the plurality of anchor carriers and the channel qualities of the plurality of other anchor carriers.

4. The method of claim 3, wherein the transmitting of the measurement information comprises:
   determining a first measurement value for the base station on the basis of the channel qualities of the plurality of anchor carriers;
   determining a second measurement value for the another base station on the basis of the channel qualities of the plurality of other anchor carriers; and
   transmitting the measurement information comprising the second measurement value to the base station on the basis of the first measurement value and the second measurement value.

5. The method of claim 1, further comprising identifying at least one anchor carrier among the plurality of anchor carriers, wherein the at least one anchor carrier is an anchor carrier that can be supported by the terminal.

6. The method of claim 5, further comprising:
   determining channel quality of the at least one anchor carrier;
   identifying a first anchor carrier on the basis of the determined channel quality; and
   transmitting information indicating the first anchor carrier to the base station.

7. The method of claim 1, wherein the primary anchor carrier is a band in which dynamic frequency selection (DFS) is not performed.

8. The method of claim 1, wherein the plurality of anchor carriers are transmitted during different respective time intervals.

9. A method performed by a base station in a wireless communication system, the method comprising:
   transmitting, to a terminal, information on a plurality of anchor carriers of unlicensed frequency band; and
   transmitting, to the terminal, an information signal (IS) for control in the unlicensed frequency band through the primary anchor carrier,
   wherein at least one anchor carrier supported by the terminal is identified from the plurality of anchor carriers,
   wherein the primary anchor carrier is identified among the at least one anchor carrier, and
   wherein the primary anchor carrier is corresponding to a continuously maintained frequency band to transmit the information signal to the terminal.

10. The method of claim 9, wherein the information signal comprises information indicating the at least one anchor carriers.

11. The method of claim 9, further comprising receiving measurement information on another base station from the terminal,
    wherein the measurement information is based on channel qualities of the plurality of anchor carriers related to the base station and channel qualities of a plurality of other anchor carriers related to the another base station.

12. The method of claim 11, wherein the receiving of the measurement information comprises, based on a first measurement value and a second measurement value, receiving the measurement information comprising the second measurement value from the terminal, wherein the first measurement value is determined by the terminal on the basis of the channel qualities of the plurality of anchor carriers, and wherein the second measurement value is determined by the terminal on the basis of the channel qualities of the plurality of other anchor carriers.

13. The method of claim 9, wherein the plurality of anchor carriers comprise at least one anchor carrier, and wherein the at least one anchor carrier is an anchor carrier that can be supported by the terminal.

14. The method of claim 13, further comprising receiving information indicating a first anchor carrier from the terminal, wherein a channel quality of the at least one anchor carrier is determined by the terminal, and wherein the first anchor carrier is identified by the terminal on the basis of the determined channel quality.

15. The method of claim 9, wherein the primary anchor carrier is a band in which dynamic frequency selection (DFS) is not performed.

16. The method of claim 9, wherein the plurality of anchor carriers are transmitted during different respective time intervals.

17. A terminal in a wireless communication system, the terminal comprising:

at least one transceiver; and at least one processor operatively coupled to the at least one transceiver and configured to:

wherein the at least one processor is configured to:

receive, from a base station (BS), information on a plurality of anchor carriers of unlicensed frequency band;

identify, from the plurality of anchor carriers, at least one anchor carrier supported by the terminal;

identify a primary anchor carrier among the at least one anchor carrier; and receive, from the base station (BS), an information signal (IS) for control in the unlicensed frequency band through the identified primary anchor carrier, and wherein the primary anchor carrier is corresponding to a continuously maintained frequency band to receive the information signal from the base station.

18. The terminal of claim 17, wherein the information signal comprises information indicating the at least one anchor carriers.

19. The terminal of claim 17, wherein the plurality of anchor carriers are transmitted during different respective time intervals.

20. The terminal of claim 17, wherein the at least one processor is further configured to:

determine channel qualities of the plurality of anchor carriers related to the base station; and determine channel qualities of a plurality of other anchor carriers related to another base station.

\* \* \* \* \*